United States Patent [19]

Boudreau et al.

[11] Patent Number: 4,654,788
[45] Date of Patent: Mar. 31, 1987

[54] ASYNCHRONOUS MULTIPORT PARALLEL ACCESS MEMORY SYSTEM FOR USE IN A SINGLE BOARD COMPUTER SYSTEM

[75] Inventors: Daniel A. Boudreau; Edward R. Salas, both of Billerica, Mass.

[73] Assignee: Honeywell Information Systems Inc., Waltham, Mass.

[21] Appl. No.: 504,751

[22] Filed: Jun. 15, 1983

[51] Int. Cl.⁴ ............... G06F 13/14; G06F 12/00; G06F 3/00
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,543,242 | 11/1970 | Adams, Jr. et al. | 364/200 |
| 3,713,107 | 1/1973 | Barsamian | 364/200 |
| 4,028,675 | 6/1977 | Frankenberg | 364/900 |
| 4,215,399 | 7/1980 | Pavicic et al. | 364/200 |
| 4,370,709 | 1/1983 | Fosdick | 364/200 |
| 4,443,846 | 4/1984 | Adcock | 364/200 |
| 4,449,183 | 5/1984 | Flahive et al. | 364/200 |
| 4,491,937 | 1/1985 | Chan | 365/154 |
| 4,493,036 | 1/1985 | Boudreau et al. | 364/200 |
| 4,509,115 | 4/1985 | Manton et al. | 364/200 |
| 4,509,140 | 4/1985 | Cheung | 364/900 |

FOREIGN PATENT DOCUMENTS 57-164338 10/1982 Japan ........................ 364/900

*Primary Examiner*—Archie E. Williams
*Assistant Examiner*—Thomas C. Lee
*Attorney, Agent, or Firm*—Faith F. Driscoll; John S. Solakian

[57] ABSTRACT

A data processing system includes an asynchronous parallel multiport volatile main memory system accessible directly by any one of M number of central processing units or by I/O controllers connected in common to any one of N number of system buses. Priority resolver circuits award access to main memory on a predetermined priority basis. Each port includes address, data in, data out, timing and control circuits which operatively couple to the priority resolver circuits. The circuits of each port and the central processing unit or system bus I/O controllers associated therewith operate independently of each other in an asynchronous manner to access and store data and to report errors.

29 Claims, 7 Drawing Figures

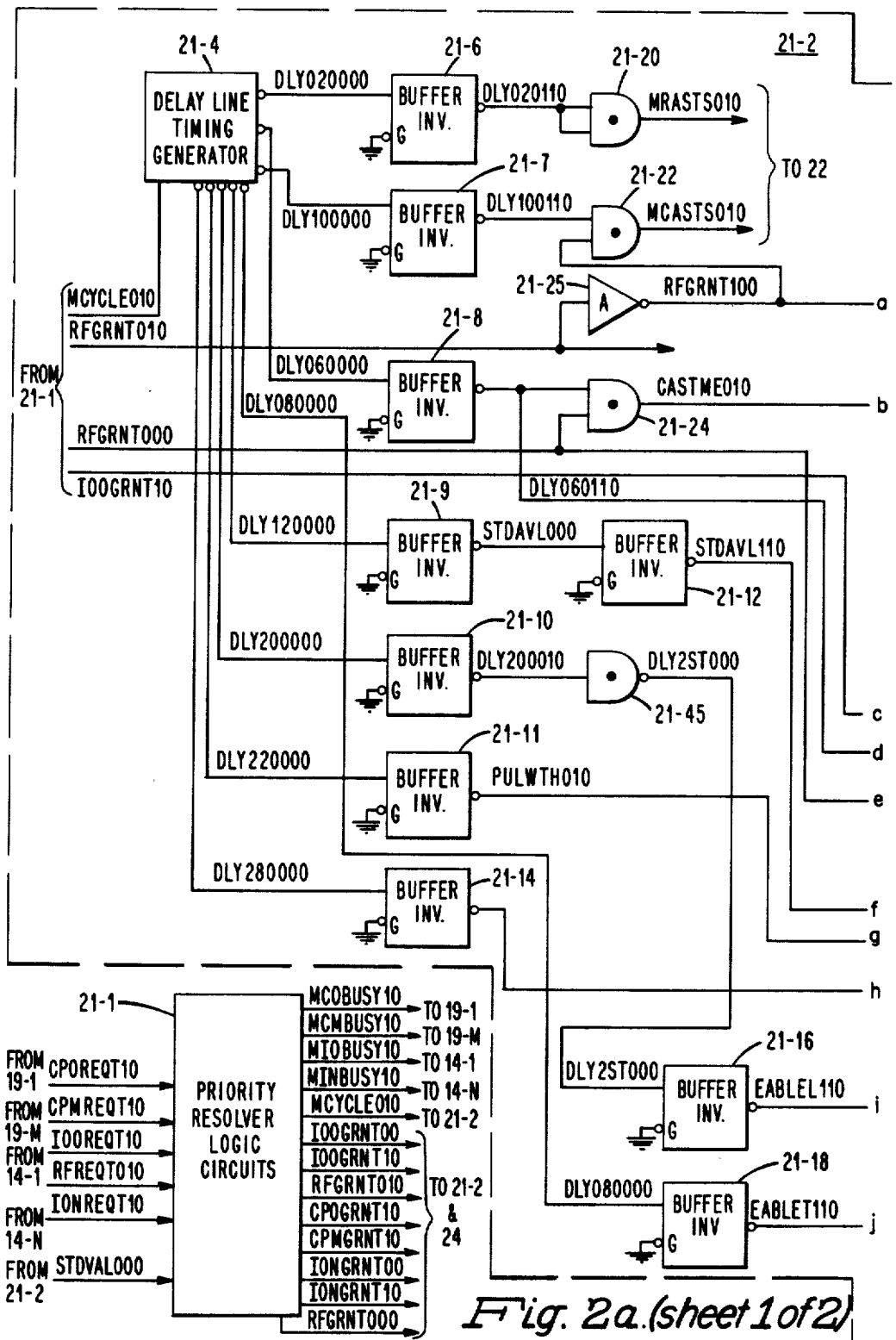
Fig. 2a. (sheet 1 of 2)

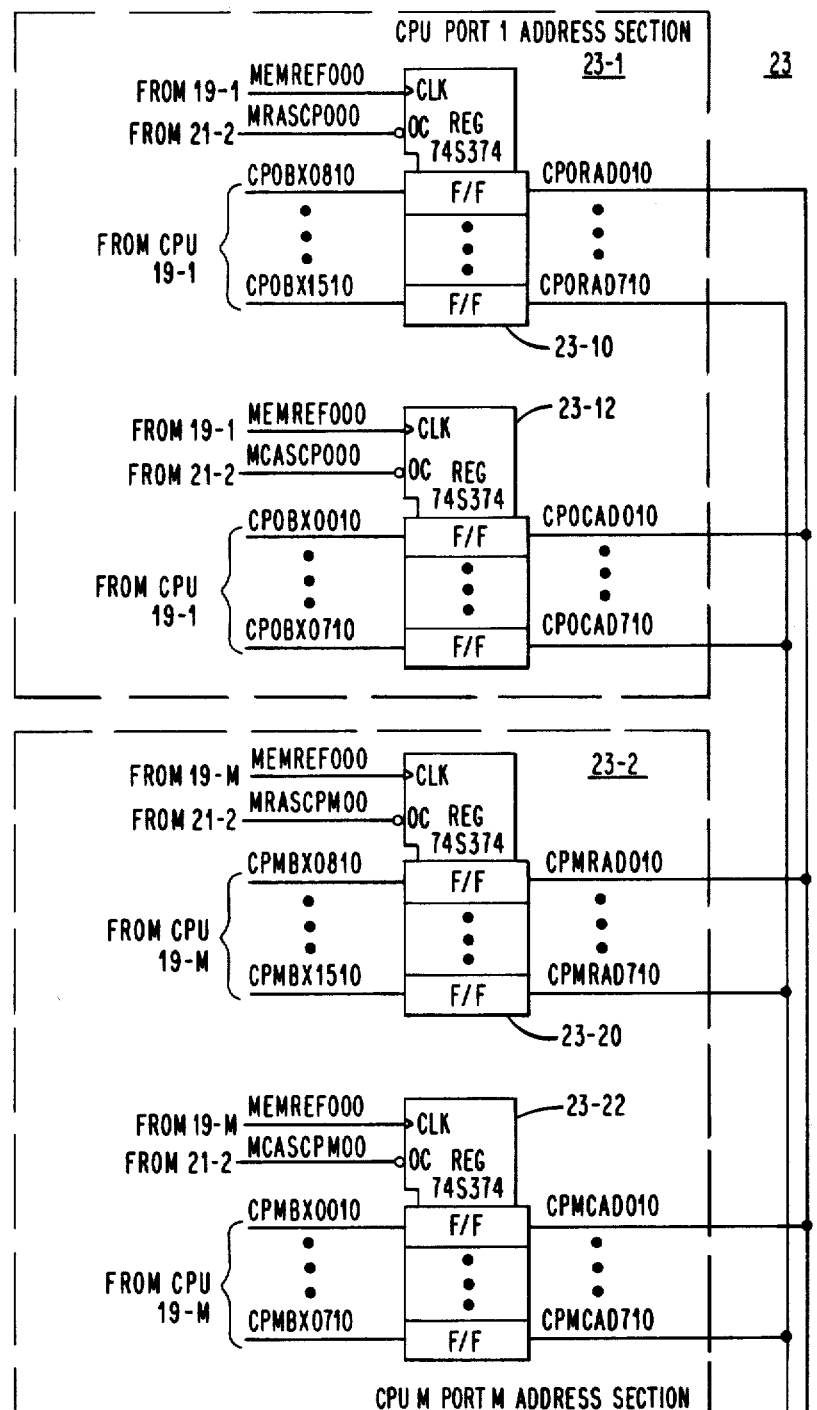
Fig. 2b. (sheet 1 of 2)

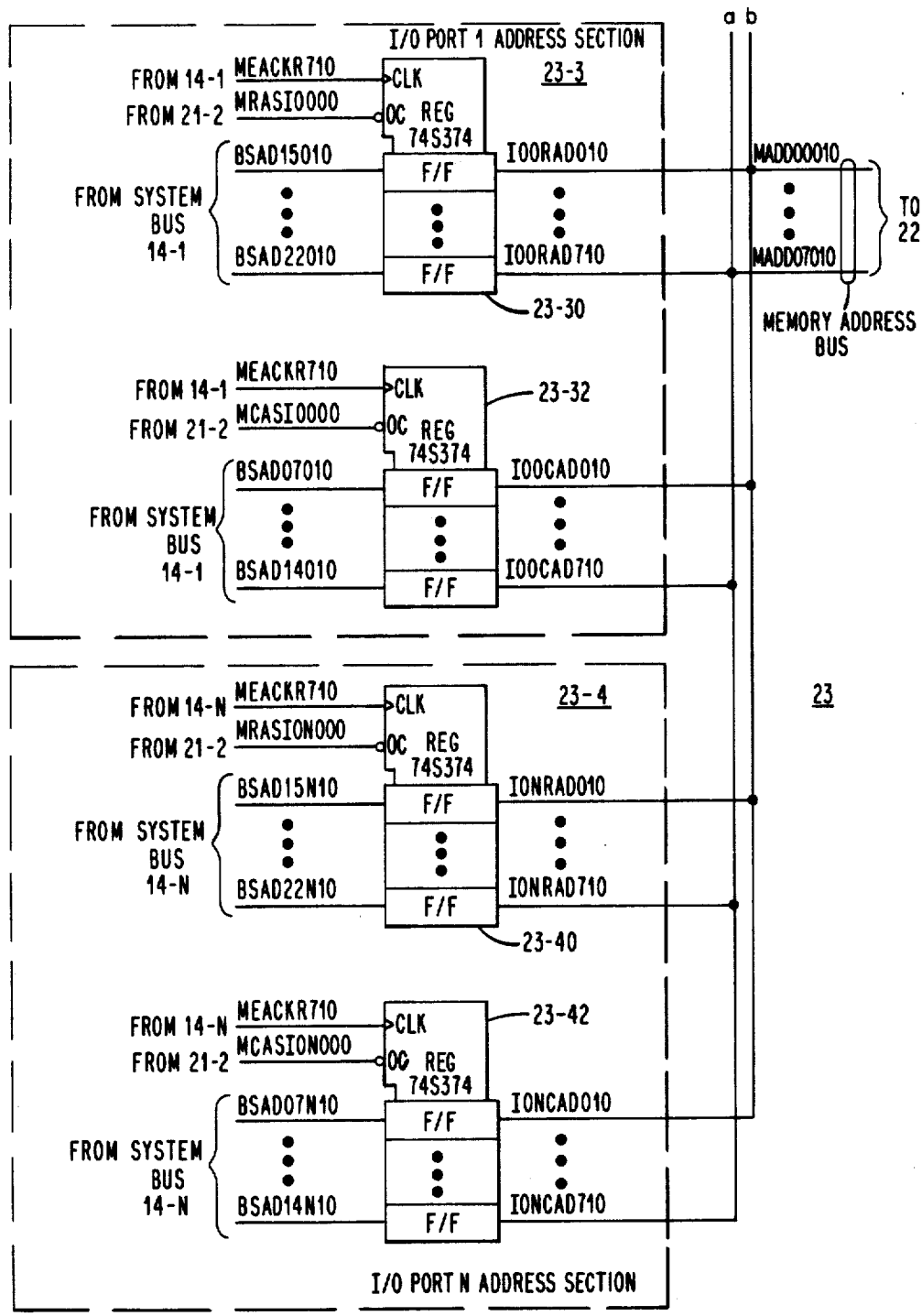
Fig. 2b. (sheet 2 of 2)

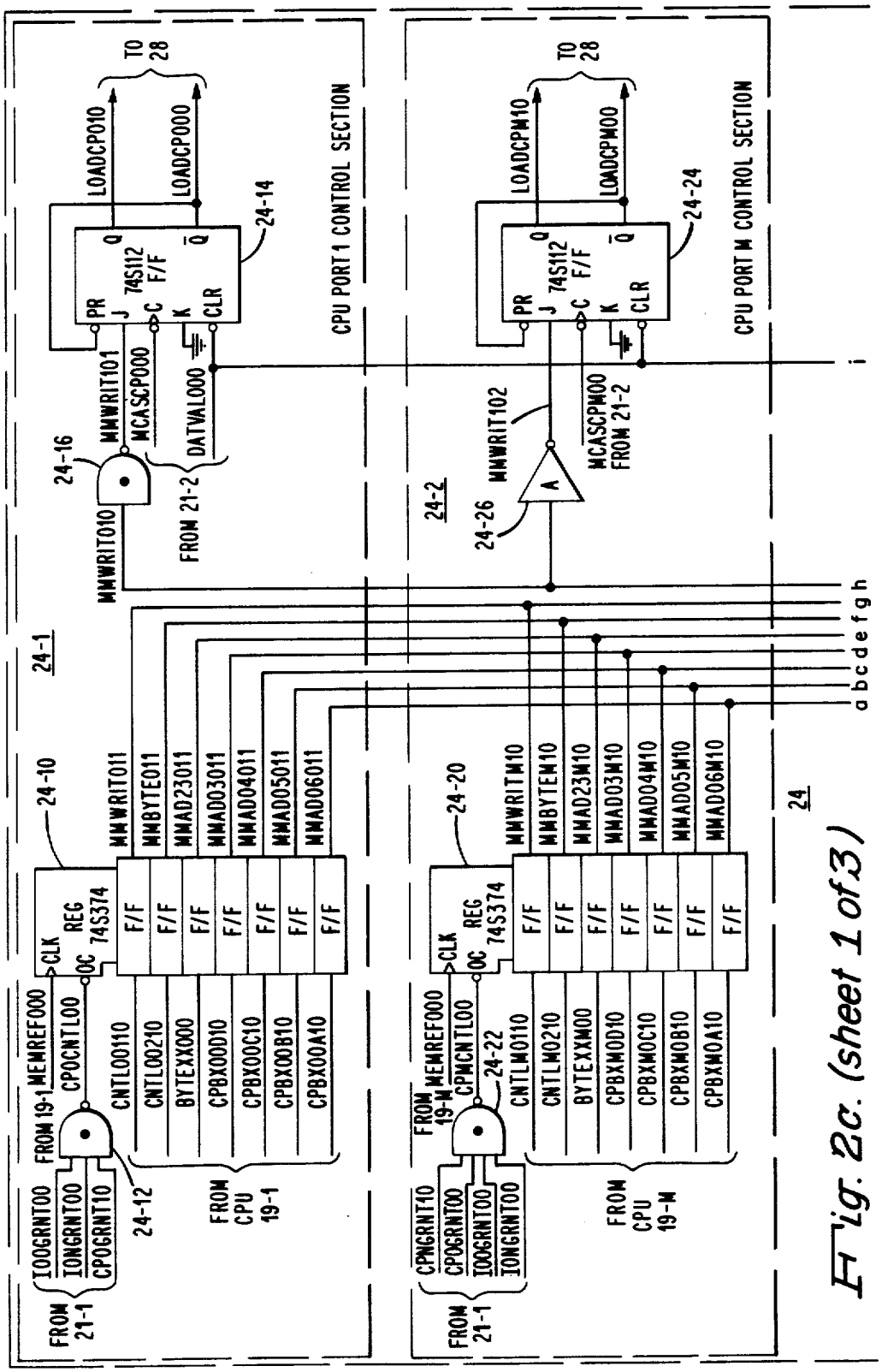
Fig. 2c. (sheet 1 of 3)

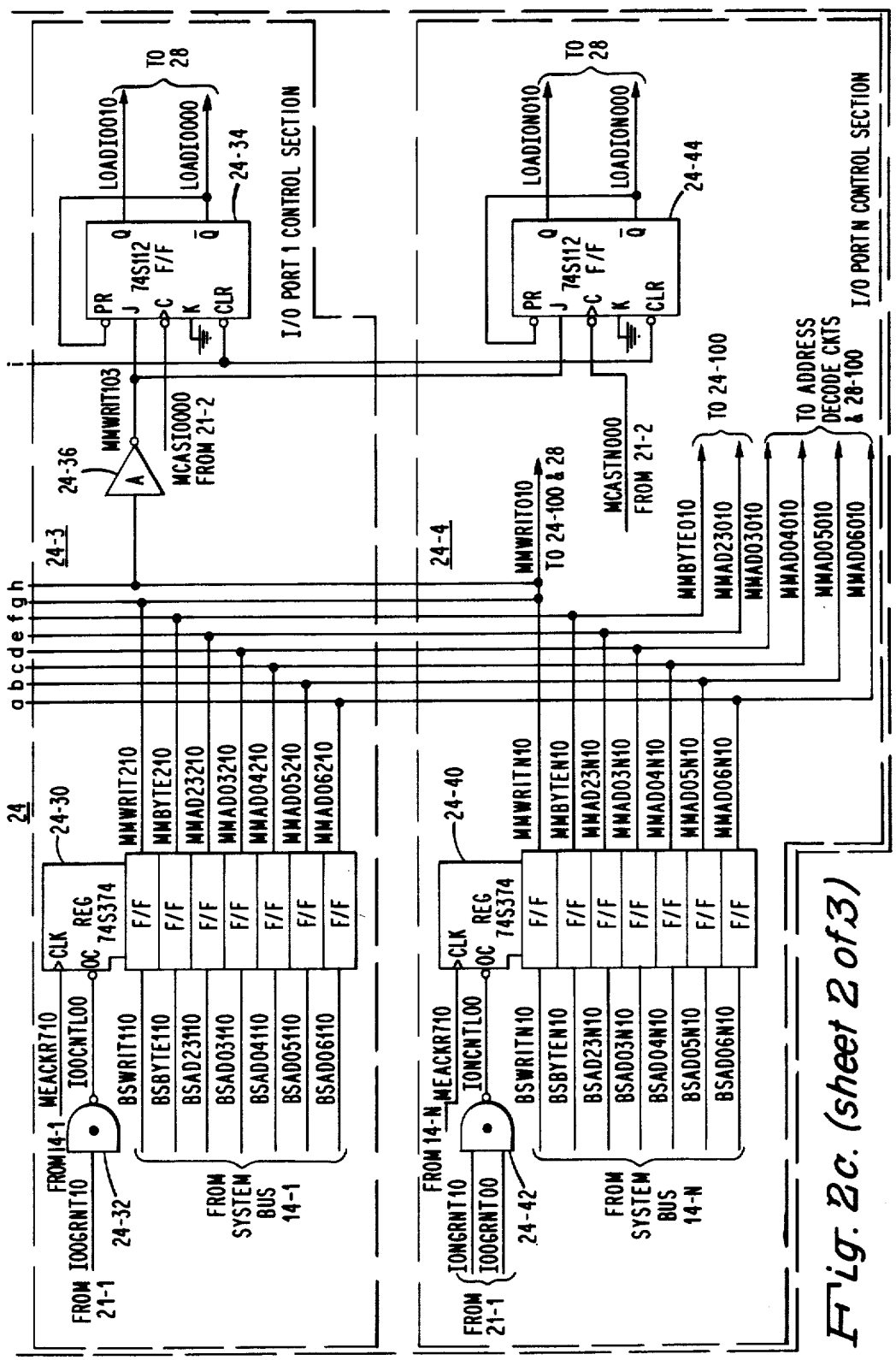
Fig. 2c. (sheet 2 of 3)

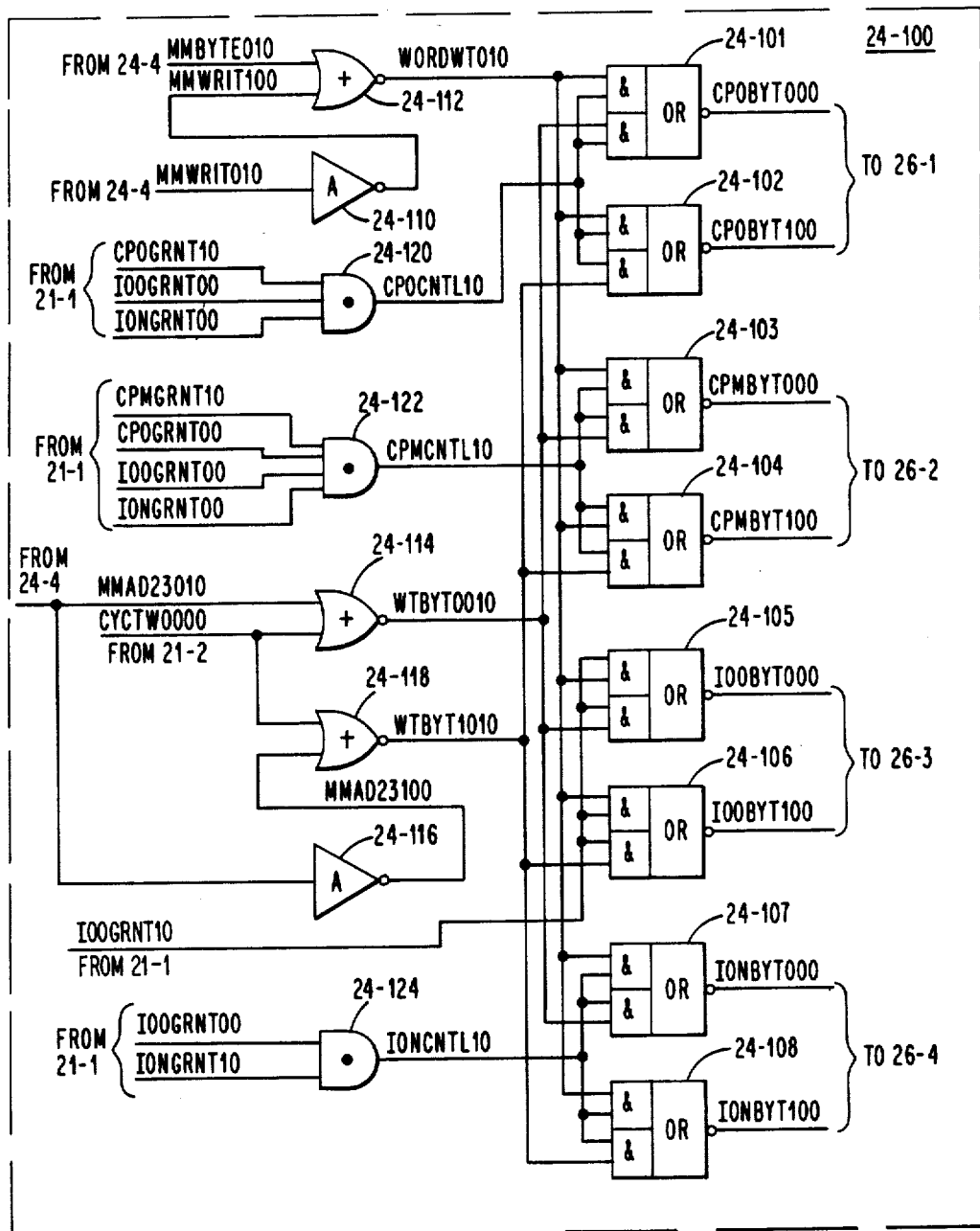
Fig. 2c. (sheet 3 of 3)

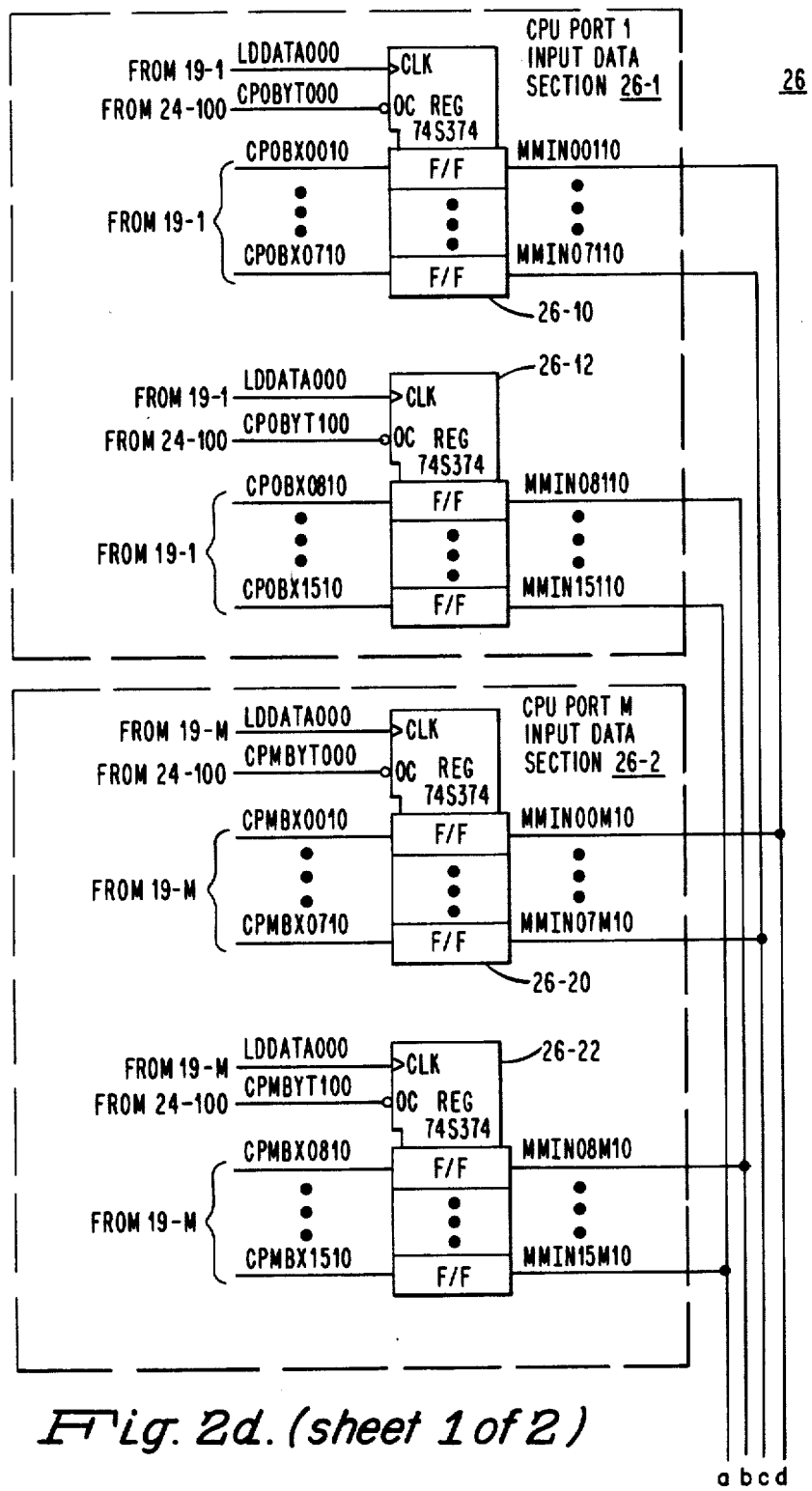
Fig. 2d. (sheet 1 of 2)

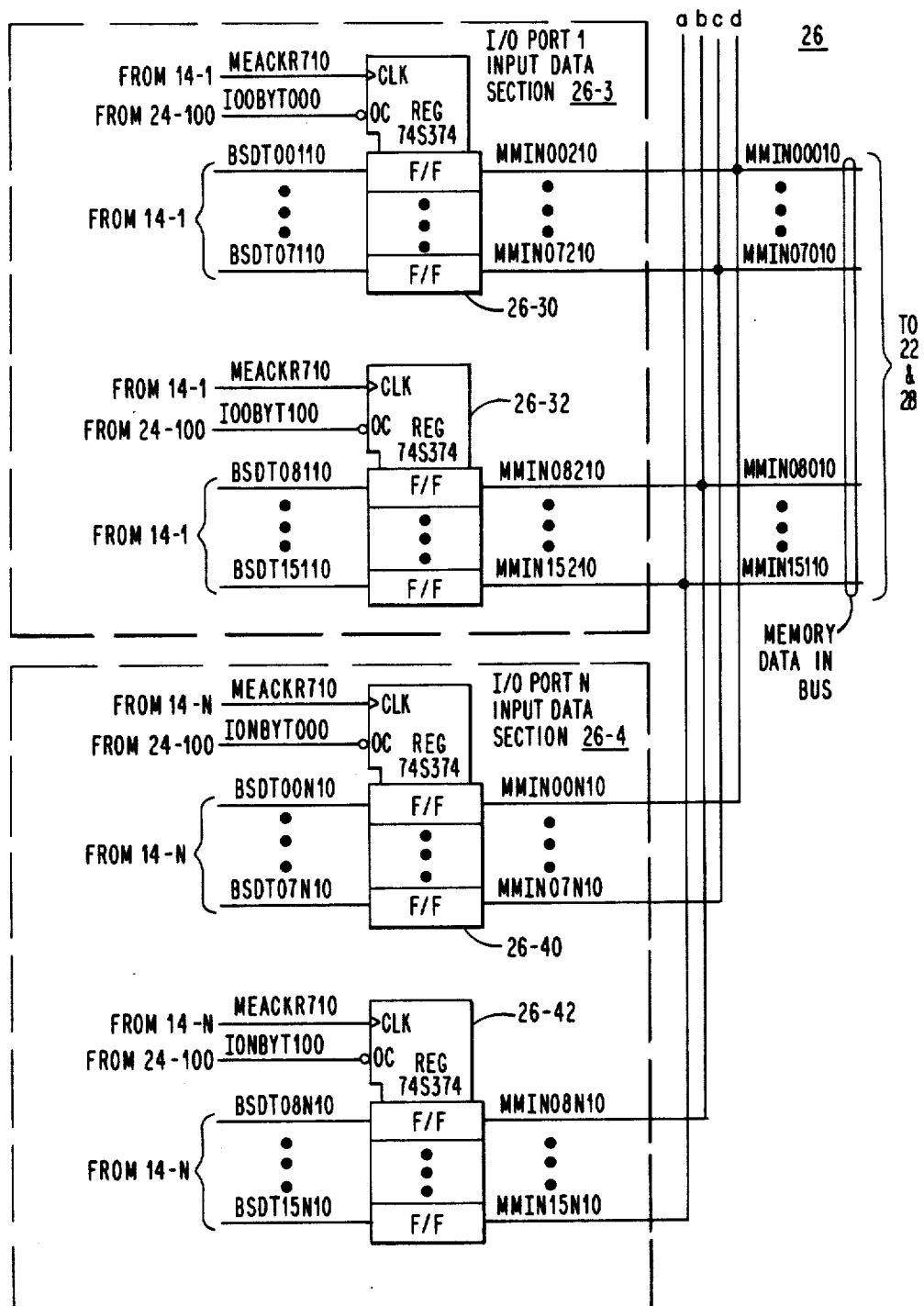
Fig. 2d. (sheet 2 of 2)

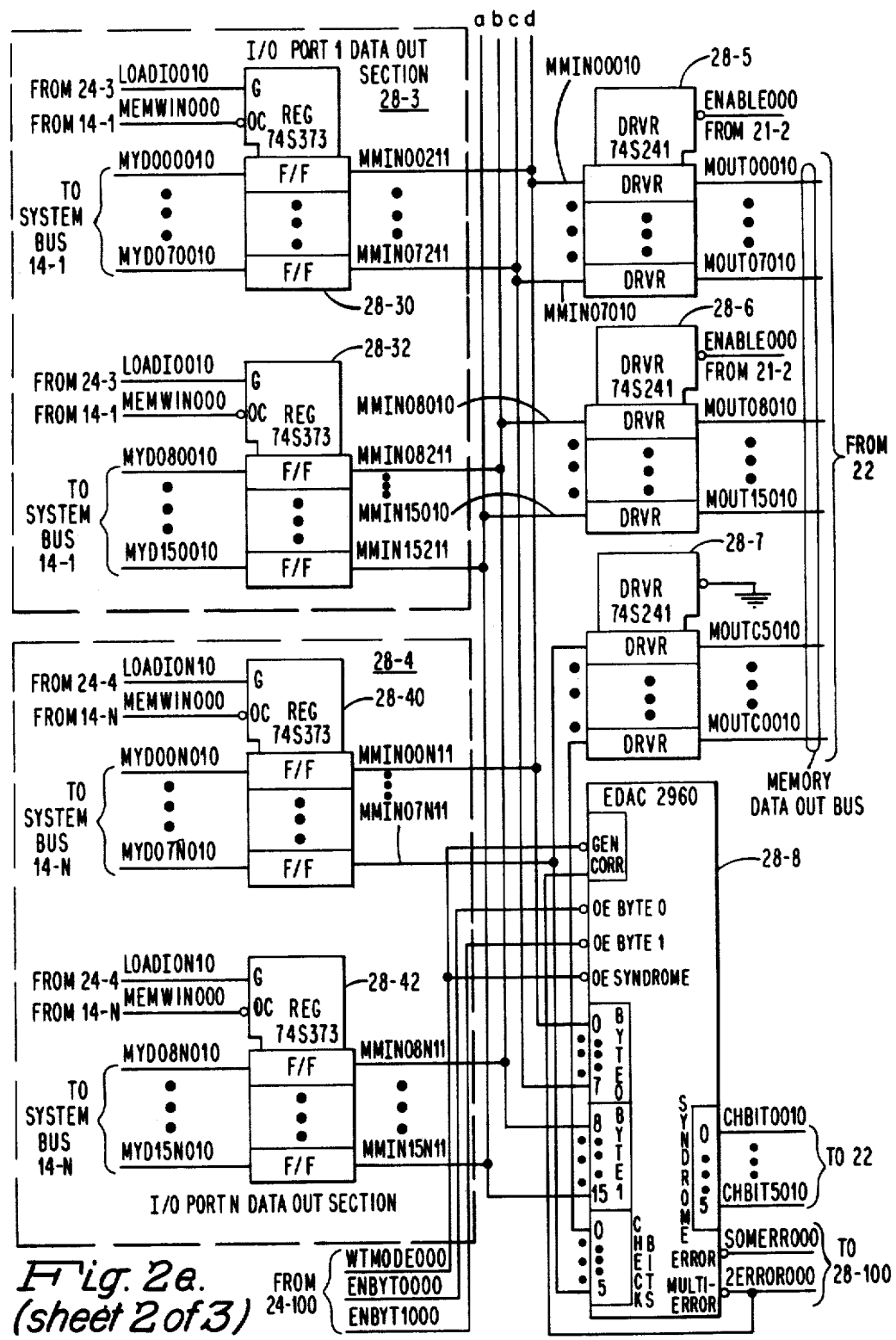
Fig. 2a. (sheet 2 of 3)

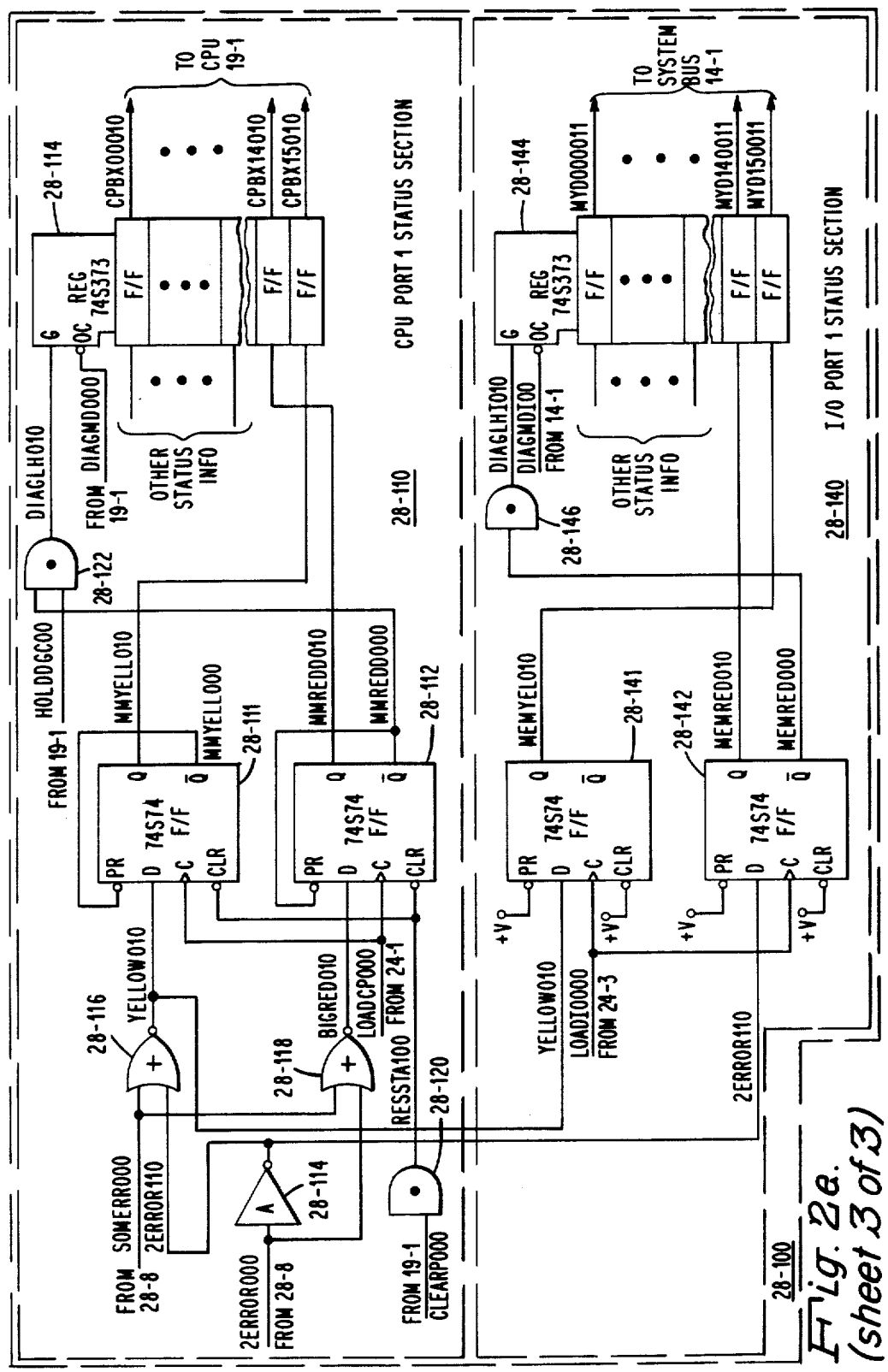
Fig. 2e. (sheet 3 of 3)

ASYNCHRONOUS MULTIPORT PARALLEL ACCESS MEMORY SYSTEM FOR USE IN A SINGLE BOARD COMPUTER SYSTEM

RELATED APPLICATIONS

The following patent applications assigned to the same assignee as named herein have related subject matter and are incorporated by reference herein as to the extent necessary.

1. "Priority Resolver with Lowest Priority Level Having Shortest Logic Path", invented by Daniel A. Boudreau and Edward R. Salas, bearing Ser. No. 449,703, filed on Dec. 14, 1982, which issued as U.S. Pat. No. 4,600,992.
2. "Technique for Determining Maximum Physical Memory Present in a System and for Detecting Attempts to Access Nonexistent Memory", invented by Daniel A. Boudreau and Edward R. Salas, bearing Ser. No. 481,107, filed on Mar. 31, 1983.
3. "Memory Identification Apparatus and Method", invented by Edward R. Salas, Edwin P. Fisher, Robert B. Johnson, Chester M. Nibby, Jr. and Daniel A. Boudreau, bearing Ser. No. 480,964, filed on Mar. 31, 1983, which issued as U.S. Pat. No. 4,545,010.
4. "Distributed Priority Network Logic for Allowing a Low Priority Unit to Reside in a High Priority Position", invented by Daniel A. Boudreau, Edward R. Salas and James M. Sandini, bearing Ser. No. 453,406, filed on Dec. 27, 1982, which was issued as U.S. Pat. No. 4,559,595.
5. "Priority Resolver Having Dynamically Adjustable Priority Levels", invented by Daniel A. Boudreau and Edward R. Salas, bearing Ser. No. 449,702, filed on Dec. 14, 1982, which issued as U.S. Pat. No. 4,493,036.

BACKGROUND OF THE INVENTION

1. Field of Use

This invention relates to data processing systems and more particularly to memory systems which have a plurality of access ports.

2. Prior Art

While multiprocessing systems are well known, recently it became desirable to implement such systems using single board computers. To facilitate such implementations, single board computers have been designed with onboard random access memories containing two access ports. This enables the onboard computer to access memory directly while other single board computers are able to access the same memory through a common system bus. An article "Multiprocessing System Mixes 8 and 16 Bit Microcomputers" by Joseph P. Barthmaier, published in the February 1980 issue of the publication Computer Design describes one such type of multiprocessor system.

While the above systems provide two points to gaining access to memory, it has been found that the access is carried out in a serial synchronous fashion. That is, a second user can not gain access to memory until the first user has completed its memory operation. This type of system is satisfactory where it is desirable to block out accesses from the system bus or where the data being fetched by the onboard computer is required to continue processing operations. However, in cases where the onboard computer is prefetching data in advance, the operating speed of the overall system is substantially degraded.

Accordingly, it is a primary object of the present invention to provide a system which minimizes the time for accessing memory by a number of competing data processing and handling units.

It is a further object of the present invention to provide a system architecture whose capacity can be easily expanded for accommodating increases in the numbers of data processing and data handling units.

SUMMARY OF THE INVENTION

The above objects are achieved according to the preferred embodiment of the present invention which is constructed to include a number of central processing units, a plurality of I/O controllers connected in common to a number of system buses and a multiport memory system. According to the present invention, the multiport memory system has sufficient number of ports for enabling each central processing unit and the I/O controllers of each system bus to have access to memory. Each port includes address, data in, data out, timing and command control circuits which are arranged to permit the central processing unit or system bus I/O controllers associated therewith to simultaneously access and store data in memory independently of other ports on a predefined priority basis. Priority resolver circuits included within the memory system connect to each of the ports and operate to establish final memory access. In the preferred embodiment, the priority resolver circuits take the form of the priority resolver which is subject of related patent application titled "Priority Resolver with Lowest Priority Level Having Shortest Logic Path".

The circuits of each port operate asynchronously in the processing of requests from the central processing unit or I/O controllers associated therewith. As soon as a memory cycle is completed, the memory system can complete the processing of the next pending request which has undergone some preliminary processing such as storage, acknowledging, etc. That is, the memory system allows the storage of memory requests even during the middle of a memory cycle when memory is being accessed by a central processing unit. This improves the overall operation of the system particularly where the central processing unit is accessing data it does not require for its immediate use. Additionally, each memory port includes error status registers and control circuits which are conditioned to store the status results of the memory port operation. This arrangement permits independent status reporting for each memory port.

The asynchronous mode of operation of the multiport memory of the present invention permits system bus I/O controllers to operate at their own rate without degrading system operation. Pending requests can be taken or removed from system buses, even though the memory may be busy. This frees up the bus for other operations, thereby improving system throughput.

In the preferred embodiment, the central processing units and memory system together form a single board computer. The direct access with memory eliminates the requirement for allocating bus cycles for carrying out CPU memory operations.

The memory system is organized so that each port includes the necessary circuits for independent asynchronous and parallel memory operations. This permits or facilitates ease of expansion and reduction in the number of central processing units and number of system buses. In the preferred embodiment, there can be up to M central processing units and N system buses, wherein M and N can have any whole integer value.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 2a through 2f show in greater detail different portions of the memory system of FIG. 1.

DESCRIPTION OF THE PREFERRED EMBODIMENT

Figure 1:
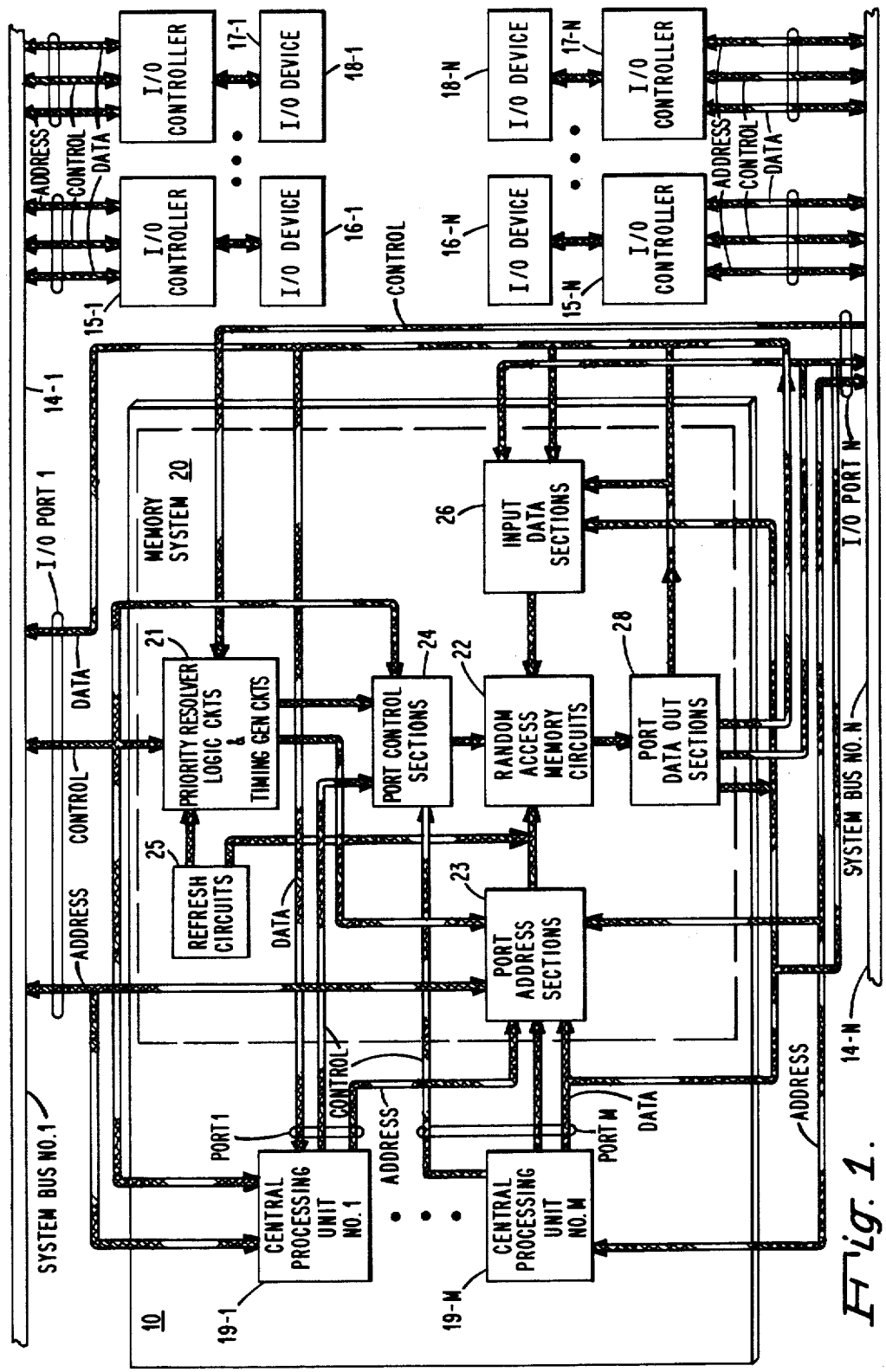
FIG. 1 is a block diagram of a preferred embodiment of the present invention which includes a memory system constructed to incorporate the principles of the present invention.

FIG. 1 shows a data processing system of the preferred embodiment. As seen from the Figure, the system includes a plurality of central processing units (CPUs) 19-1 through 19-M, a main memory system 20, a number of system buses 14-1 through 14-N. Each system bus has at least two I/O controllers with associated I/O devices. For system bus 1, these include I/O controllers 15-1 and 17-1 and devices 16-1 and 18-1, respectively. For system bus N, these I/O controllers 15-N and 17-N and devices 16-N and 18-N, respectively.

Each of the system buses includes a set of address, data and control lines which connect in common to a pair of I/O controllers and one of the central processing units 19-1 through 19-M. Communications on the bus is carried out in an asynchronous manner. Each system bus permits any two units to communicate with each other at a given time via a common (shared) signal path. Any unit wishing to communicate, requests a bus cycle. When that bus cycle is granted, that unit becomes the master and may address any other unit in the system as the slave. Most transfers are in the direction of master to slave. Some types of bus interchange require a response cycle (read memory for example).

In cases where a response cycle is required, the requestor assumes the role of the master, indicates that a response is required, and identifies itself to the slave. When the required information becomes available (depending on the response time), the slave now assumes the role of the master, and initiates a transfer to the requesting unit. This completes the interchange which has taken two bus cycles in this case. Intervening time on the bus between these two cycles may be used for other system traffic not involving these two units.

A distributed tie-breaking network provides the function of granting bus cycles and resolving simultaneous requests for use of the system bus. Priority is granted on the basis of physical position on the system bus, the highest priority being given to the first unit on the bus. Logic circuits which accomplish the tie-breaking function are distributed identically among all units connected to the bus. In a typical system, the system memory is granted the highest priority and the central processor is granted the lowest priority with the other units being positioned on the basis of their performance requirements. For further information, reference may be made to U.S. Pat. No. 3,997,896, issued Dec. 14, 1976.

In the preferred embodiment, the central processing units 19-1 through 19-M and main memory system 20 are included on a single computer board. As such, each CPU has direct access to memory, thus eliminating the need to communicate over the system bus.

The main memory system 20 includes a plurality of random access memory (RAM) circuits 22 constructed from MOS semiconductor chips. The circuits 22 and associated address and selection circuits may take the form of the circuits disclosed in the related patent application titled "Memory Identification Apparatus and Method". The semiconductor chips are periodically refreshed by refresh circuits of block 25 which can be considered conventional in design.

The refresh circuits apply input signals to priority resolver logic circuits and timing generator circuits included in block 21 of system 20. The priority resolver logic circuits in addition to receiving requests to access memory circuits 22 from the refresh circuits of block 25 also receive memory requests from each I/O port and each CPU port as shown. The priority resolver logic circuits operate to resolve competing requests from CPU 19-1 through 19-M, the system buses 14-1 through 14-N originating from the I/O controllers associated therewith, and the refresh circuits.

In the preferred embodiment, the priority resolver logic circuits take the form of the circuits disclosed in the related patent application titled "Priority Resolver with Lowest Priority Level Having Shortest Logic Path".

The priority resolver circuits assign priority levels to the different requests such that refresh requests have the highest priority, system bus I/O requests have the next highest priority and CPU requests have the lowest priority. Within the groups of requests, CPU 19-1 is assigned the highest priority and while CPU 19-M is assigned the lowest priority, while system bus 14-1 is assigned the highest priority while system bus 14-N is assigned the lowest priority.

Output grant signals indicative of the resolution of priorities during a resolution cycle are applied as inputs to the timing generator circuits of block 21 together with signals indicating the start and end of a memory cycle. The timing generator circuits operate to generate the required sequence of timing signals for carrying out a memory read or memory write cycle of operation, in response to requests from any one of the CPU and system bus I/O memory ports.

Timing signals are applied to the address sections of each of CPU and system bus I/O memory ports included in block 23. The address sections of block 23 include register circuits for storing asynchronously address signals of a memory command or request received from a CPU or the I/O controller connected to one of the system buses. Timing signals from the circuits of block 21 transfer the address signals to the RAM circuits 22 during a memory read or write cycle of operation.

Also, timing signals in addition to output grant signals from the priority resolver circuits are applied as inputs to the control sections of the CPU and system bus I/O ports of block 24. The control section of each memory port includes register and control logic circuits. The register circuits receive and store signals asynchronously received either from a CPU or from a system bus which are coded to specify the type of memory request to be processed. The control circuits combine signals from the register circuits and generate signals which are applied to the RAM circuits of block 22 for establishing whether the memory is to perform a read, write or read followed by a write cycle of operation (i.e., for a byte write command). Additionally, the control circuits apply enabling control signals to the data input sections of each of the CPU and system bus I/O ports for transferring data signals to RAM circuits 22 during a write cycle of operation.

The data input sections of the CPU and system I/O ports of block 26 include register circuits for storing data signals asynchronously received either from a CPU or from an I/O controller of one of the system buses. Under the control of the enabling signals from corresponding control sections, the signals are applied to the RAM circuits 22.

Additionally, the control sections 24 apply control signals to the data output sections of block 28 for each CPU and system bus I/O port. The data out sections of block 28 include register circuits for storing data signals read out from the RAM circuits 22 during a read cycle of operation.

MEMORY SYSTEM 20

The different portions of memory system 20 pertinent to the present invention will now be considered in greater detail with reference to FIGS. 2a through 2f.

PRIORITY RESOLVER LOGIC CIRCUITS AND TIMING AND CONTROL CIRCUITS 22

Figure 2A:
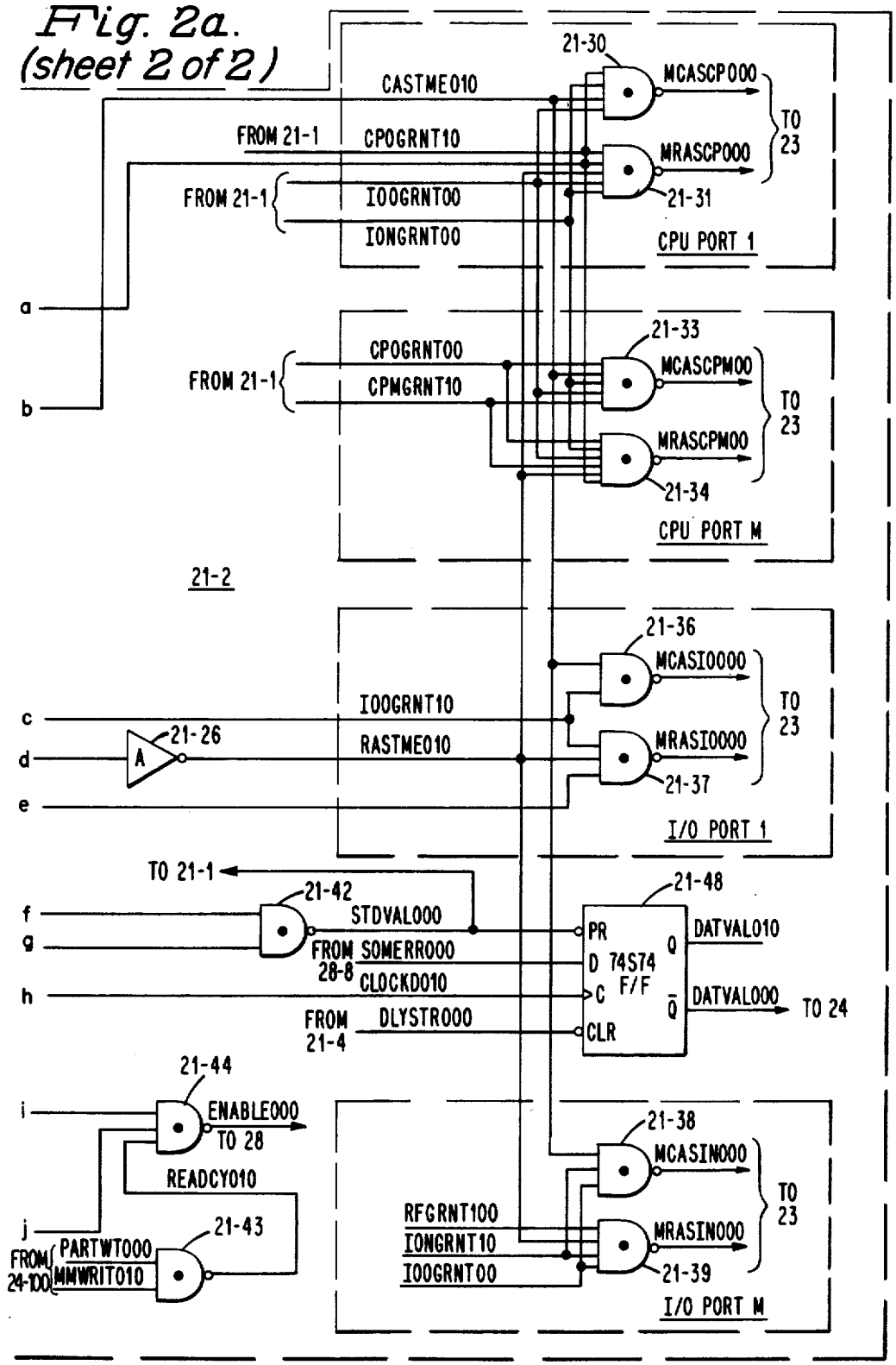

As seen from FIG. 2a, block 21 includes the priority resolver logic circuits of block 21-1 and the timing generator circuits of block 21-2. As discussed above, the priority resolver logic circuits 21-1 include flip-flops and logic circuits arranged according to the related patent application entitled "Priority Resolver with Lowest Priority Level Having Shortest Logic Path". These circuits respond on a priority basis to requests from each of the CPU memory ports 1 through M corresponding to requestor signals CPOREQT10-CPMREQT10 and each of the I/O memory ports 1 through N corresponding to requestor signals IOOREQT10-IONREQT10, in addition to refresh requestor signal RFREQT010. The request signals are stored in different ones of a first set of ask flip-flop stages.

As a function of the preassigned priority levels, the circuits of block 21-1 generate as outputs, grant signals from each requestor grant flip-flop stage indicating an intermediate result of the priority resolution cycle. For CPU ports 1-M, these signals correspond to signals CPOGRNT10 and CPMGRNT10. For I/O ports 1-N, these signals correspond to signals IOOGRNT10 and IONGRNT10. The complements of the I/O grant signals IOOGRNT00 and IONGRNT00 are also provided. The refresh grant signal and its complement correspond to signals RFGRNT010 and RFGRNT000.

In addition to the above grant signals, the circuits 21-1 generate memory cycle signal MCYCLE010 as an output. This signal is generated by NANDing together all of the complements of the grant signals (e.g. signals CPOGRNT00, IOOGRNT00, etc.). The signal MCYCLE010 when switched to a binary ONE, initiates the beginning of a memory cycle of operation before the ultimate user of the memory system has been determined as explained herein.

Further signals generated by the circuits 21-1 are memory busy signals MCOBUSY10 through MINBUSY10. Each busy signal when switched to a binary ZERO indicates to the CPU or I/O port associated therewith that the memory system is finished with the memory request received from that port. In the case of an I/O port, this signal is applied to bus response circuits associated with the system bus and when a binary ONE, it causes the bus response circuits to generate a wait response indicating that the memory system is busy. When a binary ZERO, each I/O port busy signal enables the generation of a memory acknowledgement signal MEACKR710 as discussed herein.

Each busy signal is generated by ORing the states of the output signals from the ask flip-flop and grant flip-flop stages included in block 21-1. When either a request has been received from the port stored in the ask flip-flop stage, or the grant flip-flop stage of that port has been set to a binary ONE, the port memory busy signal will be forced to a binary ONE. However, when both the ask and grant flip-flop stages are reset to binary ZEROS, this forces the port memory busy signal to a binary ZERO indicating that the memory system has completed the processing of the port request, or stated differently, that the port is available for processing another memory request.

As seen from FIG. 2a, the output grant signals IOOGRNT00 through RFGRNT000, together with memory cycle signal MCYCLE010, are applied as inputs to the timing generator and control circuits of block 21-2. These circuits generate the row address strobe and column address strobe timing signals MRASTS010 and MCASTS010 which are applied to each of the chips of the rows of chips contained in the RAM circuits 22. Additionally, these circuits generate a different set of control address signals (i.e., MCASCP000, and MRASCP000, through MCASIN000 and MRASIN000) for each CPU and I/O port. These sets of signals are applied to the address sections of block 23. They enable the row and column address signals of the port's memory request stored in the section's address registers to be applied to the rows of chips of RAM circuits 22.

Also, the circuits of block 21-2 generate signal STDVAL000 and data valid timing signals DATVAL010 and DATVAL000 whose states indicate when the data being written into or read from memory is valid. The signal STDVAL000 is returned to the priority resolution logic circuits of block 21-1 for enabling the resetting of the CPU grant flip-flop stages. Also, signal DATVAL000 is applied to the control sections of block 24 for enabling data read out from RAM circuits 22 to be latched into the registers of the specified one of the data out sections 28.

In greater detail, it is seen that the circuits of block 21-2 include a delay line timing generator 21-4, conventional in design, and a plurality of buffer-inverter circuits 21-6 through 21-18, each of which is connected to receive a different one of a plurality of timing signals DLY020000 through DLY280000 from generator 21-4.

The circuits of block 21-2 further include a plurality of AND gates 21-20 through 21-24, inverter circuits 21-25 through 21-26, a plurality of NAND gates 21-30 through 21-44 and a D-type flip-flop 21-48. The pairs of NAND gates 21-30 and 21-31, 21-33 and 21-34, 21-36 and 21-37 and 21-38 and 21-39 combine different ones of the output grant signals from the circuits 21-1 with the row address time signal RASTME010 and column address time signal CASTME010 derived from timing generator circuit 21-4.

In greater detail, buffer and inverter circuit 21-6, in response to a negative going timing pulse signal DLY020000, conditions AND gate 21-20 to generate row address strobe signal MRASTS010. The signal MRASTS010 is a positive going pulse signal which is generated at the beginning of a memory cycle (i.e., at time 0) in response to signal MCYCLE010 being forced to a binary ONE by circuits 21-1. In general, it has a pulse width from 240-260 nanoseconds.

At the start of a memory cycle, the buffer and inverter circuit 21-7 in response to negative going timing pulse signal DLY100000 conditions AND gate 21-22, in the absence of a memory refresh cycle (i.e., when signal RFGRNT100 is a binary ONE) to generate column address strobe signal MCASTS010. The signal MCASTS010 is a positive going signal which is generated approximately 65-75 nanoseconds after the start of a memory cycle or after the start of row address strobe signal MRASTS010. It has a pulse width from 210 to 230 nanoseconds.

The buffer and inverter circuit 21-8, in the absence of negative going timing pulse signal DLY060000, forces signal DLY60110 to a binary ONE. This causes inverter circuit 21-26 to force row address time signal RASTME010 to a binary ONE. The signal RASTME010 is applied as an input to a first NAND gate of each of the pairs of NAND gates 21-30 and 21-31 through 21-38 and 21-39 included within the CPU and I/O ports. Signal RASTME010 conditions one of the NAND gates 21-31, 21-34, 21-37 and 21-39 designated by the priority circuits 21-1 to force its output signal to a binary ZERO. This, in turn, enables the address register circuits of block 23 to apply the row address signals of the memory command being processed to the RAM circuits 22.

In the case of CPU port 1, signal RASTME010 conditions NAND gate 21-31 to force signal MRASCP000 to a binary ZERO when its grant signal (i.e., CPOGRNT10) is a binary ONE in the absence of a refresh cycle (i.e., signal RFGRNT100 is a binary ONE) when I/O ports 1 through N have not been granted priority (i.e., signals IOOGRNT00-IONGRNT00 are binary ONES). Similarly, signal RASTME010 conditions NAND gate 21-34 to force signal MRASCPM00 to a binary ZERO when its grant signal (i.e., CPMGRNT10) is a binary ONE and other higher priority CPU port(s) grant signals are binary ZEROS (i.e., signal CPOGRNT00 is a binary ONE), in addition to the other conditions specified for CPU port 1.

In the case of I/O port 1, signal RASTME010 conditions NAND gate 21-37 to force signal MRASIO000 to a binary ZERO when its grant signal (i.e., IOOGRNT10) is a binary ONE in the absence of a refresh cycle having been granted. Similarly, signal RASTME010 conditions NAND gate 21-39 to force signal MRASIN000 to a binary ZERO when its grant signal (i.e., IONGRNT10) is a binary ONE and other higher priority I/O port(s) grant signals are binary ZEROS (i.e., signal IOOGRNT00 is a binary ONE), in addition to the absence of a refresh cycle having been granted.

When circuit 21-8 forces signal DLY060110 to a binary ONE in response to negative going timing pulse signal DLY060000, AND gate 21-24 is conditioned to force column address time signal to a binary ONE in the absence of a refresh cycle having been granted (i.e., signal RFGRNT000 is a binary ONE). At that time, signal RASTME010 is forced to binary ZERO. Signal CASTME010 is applied as an input to a second NAND gate of each of the pairs of NAND gates 21-30 and 21-31 through 21-38 and 21-39 included within the CPU and I/O ports. Signal CASTME010 conditions one of the NAND gates 21-30, 21-33, 21-36 and 21-38 designated by the priority circuits 21-1 to force a corresponding one of the output signals MCASCP000 through MCASIN000 to a binary ZERO. This enables the address register circuits of block 23 to apply the column address signals of the memory command being processed to the RAM circuits 22.

The signals MCASCP000 through MCASIN000 are forced to binary ZEROS when the CPU and I/O grant signals have the same states as specified above for forcing timing signals MRASCP000 through MRASIN000 to binary ZEROS.

A first group of series connected buffer and inverter circuits 21-9 and 21-12 together with buffer and inverter circuit 21-11 apply pulse timing signals STDAVL110 and PULWTH010 as inputs to NAND gate 21-42. The timing signals are generated in response to the negative going pulse timing signals DLY120000 and DLY220000 as shown. NAND gate 21-42 forces output signal STDVAL000 to a binary ZERO in response to negative going timing pulse signal DLY220000 at the end of negative going timing pulse signal DLY120000. This occurs approximately 420 nanoseconds after the start of a memory cycle (i.e., three quarters through the cycle). When a binary ZERO, signal STDVAL000 switches data valid flip-flop 21-48 to a binary ONE via the preset (PR) terminal. When signal STDVAL000 is a binary ONE, the flip-flop 21-48 can switch to a binary ONE state earlier in the cycle as a function of an error signal SOMERR000 generated by the error detection and correction (EDAC) chip of FIG. 2c. Switching occurs on the leading edge of the positive pulse clocking signal CLOCKD010 which is derived by inverting the negative going pulse signal DLY280000 generated by generator 21-4 via buffer and inverter circuit 21-14. At the beginning of each memory cycle when signal MYCYCLE010 is forced to a binary ONE, signal DLYSTR000 is in turn forced to a binary ZERO. At that time, signal DLYSTR000 resets data valid flip-flop 21-48 to a binary ZERO state.

A second group of series connected buffer and inverter circuits 21-10 and 21-16 together with buffer and inverter circuit 21-28 apply timing signals EABLEL110 and EABLET110 to NAND gate 21-44. The NAND gate 21-44 receives as an additional input, a read cycle signal READCY010 from NAND gate 21-43. These signals are commanded to produce an enable read data signal ENABLE000 which is applied to driver circuits which receive the memory data signals read out from the RAM circuits 22. The signal ENABLE000 when forced to a binary ZERO conditions the drivers to apply memory data signals to the different data out sections of block 28, in addition to the EDAC chip of FIG. 2c.

ADDRESS SECTIONS OF BLOCK 23

FIG. 2b shows in greater detail, the address register circuits included within the CPU and I/O memory port address sections of block 23.

As shown, each section includes a pair of 8-bit D-type address registers which connect to the address lines of each port. These registers receive the row and column address portions of the memory command or request generated by the CPU or I/O controller connected to the port.

In greater detail, the address section 23-1 for CPU 19-1 includes registers 23-10 and 23-12. The register 23-10 receives address bits 15-22 of the CPU generated memory command address (row address) via bus lines CPOBX08 through CPOBX15. These signals are loaded into register 23-10 when CPU 19-1 asynchronously forces memory reference signal MEMREF000 positive. The register 23-12 receives address bits 7-14 of the CPU memory command address (column address via bus lines CPOBX00 through CPOBX07). The remaining high order memory command address bits (module address) are applied to the CPU control section as explained herein. Again, address bits 7-14 are loaded into register 23-12 when CPU 19-1 asynchronously forces memory reference signal MEMREF000 positive.

At the beginning of a memory cycle when CPU 19-1 has been granted priority access to memory, signal MRASCP000 is forced to a binary ZERO, the row address contents of register 23-10 corresponding to signals CPORAD010 through CPORAD710 are applied via the memory address bus to the RAM circuits 22. During the same cycle, signal MCASCP000 is forced to a binary ZERO which applies the column address contents (i.e., signals CPOCAD010 through CPOCAD710) of register 23-12 to the RAM circuits 22.

The remaining address sections 23-2 through 23-4 are similarly constructed. More specifically, section 23-2 includes registers 23-20 and 23-22. Register 23-20 receives the row address bits of the CPU generated memory command address via bus lines CPMBX08 through CPMBX15. Register 23-22 receives the column address bits of the same address via bus lines CPMBX00 through CPMBX07.

Both sets of address bits are loaded into registers 23-20 and 23-22 when CPU 19-M asynchronously forces memory reference signal MEMREF000 positive. When the circuits of block 21-2 force signals MRASCPM00 and MCASCPM00 to binary ZEROS, registers 23-20 and 23-22 respectively apply their row and column address contents (i.e., signals CPMRSAD010-710 and signals CPMCAD010-710) to RAM circuits 22 via the memory address bus.

As seen from FIG. 2b, the address section 23-3 of I/O port 1 which connects to system bus 14-1 includes registers 23-30 and 23-32. The register 23-30 is connected to receive row address bits (i.e., signals BSAD15010 through BSAD22010) of an I/O generated memory command address via address lines BSAD15 through BSAD22 of bus 14-1. Register 23-32 is connected to receive the column address bits (i.e., signals BSAD07010-14010) of the same I/O generated memory command address via address lines BSAD07 through BSAD14.

Both sets of address bits are loaded into registers 23-30 and 23-32 when the requesting I/O controller granted access to bus 14-1 asynchronously forces memory acknowledgement signal MEACKR710 positive. This signal is generated by the bus memory response circuits of the system bus 14-1 when the requesting I/O controller indicates its request for a memory cycle by asynchronously forcing a bus memory reference line BSMREF included as one of the control lines of system bus 14-1 to a predetermined state, and the priority circuits 21-1 have signalled that the port is not busy (i.e., signal IOOBUSY010=0). When the circuits of block 21-2 in turn force timing control signals MRASI0000 and MCASI0000 to binary ZEROS, registers 23-30 and 23-32 respectively are conditioned to apply their row and column address contents (i.e., signals IOORAD010-710 and signals IOOCAD010-710) to RAM circuits 22 via the memory address bus.

The last address section 23-4 included with I/O port N includes registers 23-40 and 23-42 which connect to the address lines BSAD15N-22N and BSAD07N-14N of system bus 14-N. Both sets of address bits are loaded into registers 23-40 and 23-42 when the requesting I/O controller forces signal MEACKR710 positive. This signal is generated by the bus response circuits of system bus 14-N. When the circuits of block 21-2 in turn force timing control signals MRASION000 and MCASION000 to binary ZEROS, registers 23-40 and 23-42 respectively are conditioned to apply their row and column address contents (i.e., signals IONRAD010-710 and signals IONCAD010-710) to RAM circuits 22 via the memory address bus.

CONTROL SECTIONS OF BLOCK 24

FIG. 2c shows in greater detail, the control sections of block 24 for the CPU and I/O memory ports of FIG. 1. Each of the sections 24-1 through 24-4 includes an 8-bit D-type flip-flop control register and a JK negative edge triggered output data load flip-flop with associated NAND gates. More specifically, section 24-1 includes register 24-10 which is connected to receive from CPU 19-1 memory write and byte write signals MMWRIT019 and MMBYTE010 in addition to memory address bits 23 and 3 through 6 of the CPU generated memory command address.

CPU 19-1 operates to force signals CNTL00119 and CNTL00210 to the desired states for specifying the type of memory operation to be performed. When set to a binary ONE state, signal MMWRIT010 specifies a memory write operation. By setting signal MMBYTE010 to a binary ONE, a memory partial write (byte) operation will be performed. When both signals MMWRIT010 and MMBYTE010 are binary ZEROS, the operation is read.

The states of signals BYTEXX000 through CPBXOOA10 generated by CPU 19-1 are coded to specify which memoy module or row of chips within the RAM circuits are being addressed (i.e., signals CPBX00D10-A10), in addition to which byte within a word (i.e., signal BYTEXX000) is being accessed in the case of a partial write operation.

The signals from CPU 19-1 are loaded into register 24-10 when the CPU forces memory reference signal MEMREF000 positive. When NAND gate 24-12 forces control signal CPOCNTL00 to a binary ZERO, the control and address contents of register 24-10 are applied to the register output terminals. NAND gate 24-12 forces signal CPOCNTL00 to a binary ZERO when its grant signal CPOGRNT10 is a binary ONE and the grant signals IOOGRNT00 and IONGRNT00 of the higher priority I/O ports are binary ONES.

The signals MMWRIT011, MMBYTE011 and MMAD23010 from section 24-1 are ORed with the corresponding signals from the other sections and the resulting signals MMWRIT010, MMBYTE010 and MMAD23010 are applied to the byte write control logic circuits of block 24-100. The remaining signals MMAD03011 through MMAD06011 are similarly ORed and the resulting signals MMAD03010 through MMAD06010 are applied as inputs to row address decoder circuits, not shown, included within the memory system. For the purposes of the present invention, these circuits may be considered conventional in design. They can take the form of the circuits disclosed in the related patent application entitled "Memory Identification Apparatus and Method".

As seen from FIG. 2c, the resulting memory write signal MMWRIT010 is applied to the J input terminal of CPU load flip-flop 24-14 via an input NAND gate 24-16. The flip-flop 24-14 during a read operation (i.e., when signal MMWRIT010 is a binary ZERO) switches output signal LOADCP010 from a binary ZERO to a binary ONE in response to the negative going edge of timing signal MCASCP000. Signal MCASCP000 is generated in response to signal CASTME019 when CPU 19-1 has been granted access to memory by the priority circuits 21-1. When timing signal DATVAL000 is forced to a binary ZERO, flip-flop 24-14 switches to a binary ZERO. Signal LOADCP010 is applied to the enable (G) input terminals of the registers included within the data out section 28 associated with CPU 19-1. It operates to latch the data read out from memory into the CPU's data out section registers as explained herein.

As seen from FIG. 2c, the remaining control sections 24-2 through 24-4 are similarly constructed. More specifically, in section 24-2, the control register 24-20 is loaded with CPU generated control and address signals CNTLM0110 through CPBXMOA10 applied when CPU 19-M forces signal MEMREF000 positive. When a NAND gate 24-22 forces a control signal CPMCNTL00 to a binary ZERO, it causes the control and address contents of register 24-20 to be applied to their output terminals as signals MMWRITM10 through MMAD06M10. The NAND gate 24-22 is conditioned to force signal CPMCNTL00 to a binary ZERO when the CPU grant signal CPMGRNT10 is a binary ONE and the remaining higher priority port grant signals CPOGRNT00, IOOGRNT00 and IONGRNT00, generated by priority circuits 21-1, are binary ONES.

Section 24-2 further includes a load flip-flop 24-24 whose input terminal is connected to receive memory write signal MMWRIT010 via an inverter circuit 24-26. In the case of a memory read command, when CPU 19-M has been granted memory access by the priority circuits 21-1, the circuits 21-2 generate timing signal MCASCPM00. The negative going edge of signal MCASCPM00 switches flip-flop 24-24 from a binary ZERO to a binary ONE. The flip-flop 24-24 remains in that state until timing signal DATVAL000 is forced to a binary ZERO by circuits 21-2 causing flip-flop 24-24 to reset to a binary ZERO. Signal LOADCPM10 is applied to the enable (G) input terminals of the registers included within the data out section associated with CPU 19-M. As described above, load signal LOADCPM10 operates to latch the data read out from memory into the CPU's data out section registers.

Control section 24-3 and 24-4 provide control and address storage and load output register control for I/O port 1 and I/O port N, respectively. In greater detail, the register 24-30 is loaded with control and address signals BSWRIT110 through BSAD06110 generated by any one of the I/O controllers connected to system bus 14-1 applied via the bus address and control lines when the requesting I/O controller asynchronously forces signal MEACKR710 positive. This signal is generated by the bus response circuits associated with system bus 14-1 as described above. When I/O port 1 is granted memory access by priority circuits 21-2, grant signal IOOGRNT10 is forced to a binary ONE. This causes NAND gate 24-32 to force control signal IOOGNTRL00 to a binary ZERO which conditions register 24-30 to apply its control and address contents to its output terminals as signals MMWRIT210 through MMAD06210.

Section 24-3 further includes a load flip-flop 24-34 whose J input terminal is connected to receive memory write signal MMWRIT010 via an inverter circuit 24-36.

In response to a memory read command, when I/O port 1 has been granted access to memory, the circuits 21-2 generate timing signal MCASI0000 whose negative edge switches flip-flop 24-34 to a binary ONE. The flip-flop 24-34 is reset to a binary ZERO when the circuits 21-2 force timing signal DATVAL000 to a binary ZERO. Signal LOADI0010 is applied to the enable input terminals of the registers included within the data out section associated with I/O port 1 of system bus 14-1.

The last control section 24-4 includes register 24-40 which is loaded with control and address signals BSWRITN10 through BSAD06N10 received from any one of the I/O controllers connected to system bus 14-N of I/O port N. This occurs when the requesting I/O controller asynchronously forces signal MEACKR710 positive. When I/O port N is granted memory access, the port's grant signal is forced to a binary ONE at which time the higher priority I/O port grant signal IOOGRNT00 is a binary ZERO. These signals cause a NAND gate 24-42 to force control signal IONCNTL00 to a binary ZERO which conditions register 24-40 to apply its control and address contents to its output terminals as signals MMWRITN10 through MMAD06N10.

Section 24-4 furher includes load flip-flop 24-44 whose J input terminal is connected to receive memory write signal MMWRIT010 via inverter circuit 24-36. In response to a memory read command when I/O port N is granted memory access, the circuits 21-2 generate timing signal MCASTN000 whose negative edge switches flip-flop 24-44 to a binary ONE. The flip-flop 24-44 is later reset to a binary ZERO when signal DATVAL000 switches to a binary ZERO. The signal LOADION010 is applied to the enable input terminals of the registers included within the data out section of I/O port N connected to system bus 14-N.

The control circuits of block 24 further include the byte write control circuits of block 24-100. As shown, these circuits include a plurality of pairs of NAND/NOR gates 24-101, 24-102 through 24-107, 24-108. Each pair of gates provide output signals which are applied to the enable input terminals of the registers included within the data input section of the CPU or I/O port associated therewith for enabling the data to be applied to RAM circuits 22 during a memory write cycle of operation.

A write full word signal WORDWT010 generated by an inverter circuit 24-110 and NOR gate 24-112 is applied as an input to one AND gate of each of the pairs of gates 24-101 through 24-108. The NOR gate 24-112 forces signal WORDWT010 to a binary ONE when a write non-byte operation is specified by the circuits of sections 24-1 through 24-4 (i.e., signal MMWRIT010 is a binary ONE and signal MMBYTE010 is a binary ZERO).

A first write byte signal WTBYT0010 generated by NOR gate 24-114 applied as an input to another AND gate of one gate of each of the pairs of gates 24-101 through 24-108 (i.e., 24-101, 24-103, 24-105 and 24-107). A second write byte signal WTBYT1010 generated by an inverter circuit 24-116 and NOR gate 24-118 is applied as an input to another AND gate of the other gate of each of the pairs of gates 24-101 through 24-108 (i.e., 24-102, 24-104, 24-106 and 24-108).

The appropriate one of the write byte signals WTBYT0010 and WTBYT1010 is forced to a binary ONE during the second half of a partial write cycle of operation (i.e., signal CYCTW0000 is a binary ZERO) as a function of the state of memory address bit 23 (i.e., signal MMAD23010) furnished by sections 24-1 through 24-4.

In addition to the above signals, each of the pairs of gates 24-010 through 24-108 is connected to receive corresponding ones of the CPU and I/O grant signals from priority circuits 21-1. More specifically, each one of the pair of gates associated with CPU 19-1 receives a control signal CPOCNTL10 from an input AND gate 24-120. AND gate 24-120 forces signal CPOCNTL10 to a binary ONE when its CPU grant signal CPOGRNT10 is a binary ONE and the other higher priority I/O port grant signals IOOGRNT00 and IONGRNT00 are binary ONES.

When a binary ONE, signal CPOCNTL10 partially enables NAND/NOR gates 24-101 and 24-102 so that signals CPOBYT000 and CPOBYT100 switch state as a function of the states of signals WORDWT010, WTBYT0010 and WTBYT1010. That is, when signal WORDWT010 is a binary ONE, gates 24-101 and 24-102 force signals CBOBYT00 and CBOBYT100 to binary ZEROS which enables the transfer of data to the RAM circuits of block 22 from the data input section 26-1 as discussed herein. When signal WORDWT010 is a binary ONE, gates 24-101 and 24-102, respectively, force signals CBOBYT000 and CBOBYT100 to binary ZEROS in response to signals WTBYT0010 and WTBYT1010 being forced to binary ZEROS. It will be understood that only one of the signals WTBYT0010 and WTBYT1010 is switched to a binary ZERO as a function of the state of signal MMAD23010.

Each of the pair of gates 24-103 and 24-104 associated with CPU 19-M is connected to receive a control signal CPMCNTL10 from an input AND gate 24-122. AND gate 24-122 forces signal CPMCNTL10 to a binary ONE when its CPU grant signal CPMGRNT10 is a binary ONE and the other higher priority CPU and I/O port grant signals CPOGRNT00, IOOGRNT00 and IONGRNT00 are binary ONES. When a binary ONE, signal CPMCNTL10 partially enables NAND/NOR gates 24-103 and 24-104 so that signals CPMBYT000 and CPMBYT100 switch state as a function of the states of signals WORDWT010, WTBYT0010 and WTBYT1010. Such switching occurs as described above. When gates 24-103 and 24-104 force signals CPMBYT000 and CPMBYT100 to binary ZEROS, this enables the transfer of data to the RAM circuits of block 22 from the data input section 26-2 as discussed herein.

Each of the pair of gates 24-105 and 24-106 is connected to receive I/O grant signal IOOGRNT10 from priority circuits 21-1. When forced to a binary ONE, signal IOOGRNT10 partially enables NAND/NOR gates 24-105 and 24-106 so that signals IOOBYT000 and IOOBYT100 switch state as a function of the states of signals WORDWT010, WTBYT0010 and WTBYT1010 as described above. When gates 24-105 and 24-106 force signals IOOBYT000 and IOOBYT100 to binary ZEROS, this enables the transfer of memory data from data input section 26-3 to the RAM circuits of block 22.

The last pair of NAND/NOR gates 24-107 and 24-108 associated with I/O port N are connected to receive a control signal IONCNTL10 from an AND gate 24-124. AND gate 24-124 forces signal IONCNTL10 to a binary ONE when its I/O grant signal IONGRNT10 is a binary ONE and the higher priority I/O grant signal IOOGRNT00 is a binary ONE. When a binary ONE, signal IONGRNT10 partially enables NAND/NOR gates 24-107 and 24-108 so that signals IONBYT000 and IONBYT100 switch state as a function of signals WORDWT010, WTBYT0010 and WTBYT1010 as described above. When gates 24-107 and 24-108 force signals IONBYT000 and IONBYT100 to binary ZEROS, this enables the transfer of memory data from data input section 26-4 to the RAM circuits of block 22.

INPUT DATA SECTIONS OF BLOCK 26

FIG. 2d shows in greater detail, the input data register circuits included within the CPU and I/O port data input sections 26-1 through 26-4 of block 26.

As shown, each section includes a pair of 8-bit D-type registers which connect to the data lines of each port. These registers receive the data word portion of the memory write command or request generated by the CPU or requesting I/O controller connected to the port.

In greater detail, the data in section 26-1 for CPU 19-1 includes registers 26-10 and 26-12. The register 26-10 receives a first byte (signals CPOBX0010-0710) of the CPU data word via bus lines CPOBX00 through CPOBX07. These signals are latched into register 26-10 when CPU 19-1 asynchronously forces a load data signal LDDATA000 positive. The register 26-12 receives a second byte (signals CPOBX0810-1510) of the CPU data word via bus lines CPOBX08 through CPOBX15. Again, the second byte is loaded into register 26-12 when CPU 19-1 asynchronously forces signal LDDATA000 positive.

During a memory write cycle when CPU 19-1 has been granted priority access to memory, signals CPOBYT000 and CPOBYT100 are forced to binary ZEROS by the byte control circuits of block 24-100. this applies the data contents of registers 26-10 and 26-12 corresponding to signals MMIN00110 through MMIN15110 via the memory data in bus to the RAM circuits 22. It will be noted that the output terminals of the registers 26-10 and 26-12 are ORed together with corresponding output terminals of the registers of the remaining sections forming the memory data in bus.

The remaining data in sections 26-2 through 26-4 are identically constructed. More specifically, section 26-2 includes registers 26-20 and 26-22 which receive the different bytes of a word from CPU 19-M from bus lines CPMBX00-15. The data word bytes are loaded into registers 26-20 and 26-22 when CPU 19-M asynchronously forces load data signal LDDATA000 positive. The data contents of these registers, corresponding to signals MMIN00M10-15M10, are applied to RAM circuits 22 via the memory data in bus during a memory write cycle when signals CPMBYT00 and CPMBYT100 are forced to binary ZEROS.

As seen from FIG. 2d, the data in section 26-3 of I/O port 1 which connects to the data lines of system bus 14-1 includes registers 26-30 and 26-32. The data word bytes of a memory write command received from the requesting I/O controller via data lines BSDT00-15 of bus 14-1 are loaded into registers 26-30 and 26-32 when the I/O controller asynchronously causes memory acknowledgement signal MEACKR710 to be forced positive. The signal MEACKR710 is generated in the manner previously discussed. The data contents of these registers corresponding to signals MMIN00210 through MMIN15210 are applied to RAM circuits 22 via the memory data in bus during a memory write cycle when signals IOBYT000 and IOOBYT100 are forced to binary ZEROS by the circuits of block 24-100.

The last section 26-4 included as part of I/O port N contains registers 26-40 and 26-42 which connect to the data lines BSDT00N-15N of system bus 14-N. The data word bytes of a memory write command received from the requesting I/O controller via data lines BSDT00N-15N are loaded into registers 26-40 and 26-42 when the I/O controller asynchronously causes memory acknowledgement signal MEACKR710 to be forced positive. The data contents of these registers corresponding to signals MMIN00N10 through MMIN15N10 are applied to RAM circuits 22 via the memory data in bus during the memory write cycle when signals IONBYT000 and IONBYT100 are forced to binary ZEROS by the circuits of block 24-100.

DATA OUT SECTIONS OF BLOCK 28

FIG. 2e shows in greater detail, the data register circuits included within the CPU and I/O port data out sections 28-1 through 28-4 of block 28. Additionally, FIG. 2e shows the interface driver circuits 28-5 through 28-7 which couple to the memory data out bus, an error detection and correction EDAC unit 28-8 and the error status sections of block 28-100, used for generating six check bits of each 16-bit data word and for detecting and correcting single bit errors and detecting and signalling without correction double bit (multiple) errors in such data words.

As shown, each section includes a pair of 8-bit D-type registers which connect to the input data lines of each port. These registers receive the data word read out from RAM circuits 22 in response to a memory read command from the particular port. Thereafter, under the control of the CPU or I/O port, the data contents of the registers are transferred to the CPU or requesting I/O controller.

In greater detail, the data out section 28-1 for CPU 19-1 includes registers 28-10 and 28-12. These registers receive the 16 data bits of a word read out from RAM circuits 22 via the tristate driver circuits 28-5 and 28-6. At the same time, the 16 data bits, together with six check bits, read out from memory via the tristate driver circuits 28-7 are applied to the data in and check bit input terminals of EDAC chip 28-8. The tristate driver circuits 28-5 and 28-6 are enabled to apply signals MOUT00010 through MOUT15010 read out from RAM circuits 22 to their output terminals as signals MMIN0010 through MMIN01510 when signal ENABLE000 is forced to a binary ZERO by the circuits 21-2. The 16 data bits (signals MMIN00111-15111) are loaded into registers 28-10 and 28-12 when the CPU port control section 24-1 forces load signal LOADCP010 positive. The data bits are latched in the registers when load signal LOADCP010 is reset to a binary ZERO (i.e., negative going transition). The data contents of registers 28-10 and 28-12 are applied to the input data lines CPOBX00-15 of CPU 19-1 via the register output terminals as signals CPOBX00010-1510 when CPU 19-1 asynchronously forces signal ENDTBX100 to a binary ZERO.

The data out section 28-2 for CPU 19-1 includes registers 28-20 and 28-22. The 16 data bit signals (MMIN00M11-15M11) received from driver circuits 28-5 and 28-6 are loaded into registers 28-20 and 28-22 when the CPU port control section 24-2 forces load signal LOADCPM10 positive. The data bits are latched in the registers when load signal LOADCPM10 is reset to a binary ZERO. The data contents of registers 28-20 and 28-22 are applied to the input data lines CPMBX00-15 to CPU 19-M via the register output terminals as signals CPOBX00010-1510 when CPU 19-M asynchronously forces signal ENDTBX100 to a binary ZERO.

The data out section 28-3 for I/O port 1 includes registers 28-30 and 28-32. The 16 data bit signals (MMIN00211-15211) received from driver circuits 28-5 and 28-6 are loaded into registers 28-30 and 28-32 when the I/O port control section 24-3 forces load signal LOADI0010 positive. The data bit signals are latched into the registers when load signal LOADI0010 is reset to a binary ZERO. The data contents of registers 28-30 and 28-32 are applied to the data lines MYD000-MYD150 of the system bus 14-1 via the register output terminals as signals MYD000010-150010 when the requesting I/O controller connected to system bus 14-1 asynchronously causes bus memory signal MEMWIN000 to be forced to a binary ZERO. As explained herein, signal MEMWIN000 is generated by the priority bus control circuits of system bus 14-1 in response to the memory request previously received from the requesting I/O controller.

The last data out section 28-4 for I/O port N includes registers 28-40 and 28-42. The 16 data bit signals (MMIN00N11-15N11) received from driver circuits 28-5 and 28-6 are loaded into registers 28-40 and 28-42 when the I/O port control section 24-4 forces load signal LOADION10 positive. The data bit signals are latched into the registers when load signal LOADION010 is reset to a binary ZERO. The data contents of registers 28-40 and 28-42 are applied to the data lines MYD00N-MYD15N of the system bus 14-N via the register output terminals as signals MYD00N010-15N010 when the requesting I/O controller connected to system bus 14-N asynchronously causes bus memory signal MEMWIN000 to be forced to a binary ZERO.

It will be noted that the signals MMIN0010 through MMIN15110 are the same signals as those applied to the memory data in bus of FIG. 2d. Accordingly, EDAC chip 28-8 operates during a memory write cycle of operation to generate appropriate check bits at its syndrome output terminals for the 16 data bits applied to the data in terminals by one of the sections 26-1 through 26-4. During a memory read cycle of operation, EDAC chip 28-8 operates to compare the check bits read from RAM circuits 22 against a set of check bits generated from the data bits read from RAM circuits 22. If chip 28-8 detects no errors, it forces signals SOMERR000 and 2ERROR000 high (to binary ONES). If one or more errors are detected, chip 28-8 forces signal SOMERR000 low (i.e., to a binary ZERO). When two or more errors are detected, chip 28-8 forces both signals SOMERR000 and 2ERROR000 low (i.e., to binary ZEROS).

The chip 28-8 is placed in a generate or detect/correct mode of operation as specified by the state of write mode signal WTMODE000. This signal is generated as a function of the memory write signal MMWRIT010 from the circuits 24-100. When signal WTMODE000 is a binary ZERO (low), chip 28-8 is placed in the check bit generate mode and when signal WTMODE000 is a binary ONE (high) chip 28-8 is placed in the detect or correct mode. The states of signals ENBYT0000 and ENBYT1000 are derived from the states of signals WTBYT0010 and WTBYT1010 generated by the circuits 24-100 which control which corrected bytes are applied to the data terminals of the chip 28-8. As shown, the error signals SOMERR000 and 2ERROR000 are applied as inputs to the status section 28-100. In the preferred embodiment, chip 28-8 is implemented from a cascadable 16-bit error detection and correction unit designated as AM2960EDC manufactured by Advanced Micro Devices, Inc. For further information about the operation of this device, reference may be made to the publication "Bipolar Microprocessor Logic and Interface Data Book", published by Advanced Micro Devices, Inc., Copyright 1981.

ERROR STATUS SECTIONS OF BLOCK 28-100

FIG. 2e also shows the status sections of block 28-100 for the CPU and I/O ports. For the purposes of the present invention, these sections can be considered as part of the block 28 of FIG. 1. For ease of simplicity, only the sections 28-110 and 28-130 included within CPU port 1 and I/O port 1, respectively, are shown. As seen from FIG. 2e, status section 28-110 includes a first error flip-flop 28-111 and a second error flip-flop 28-112 which apply error status signals as inputs to two stages of a 16-bit diagnostic status register 28-114. The register 28-114 receives additional status information from other parts of the system, such as module address bits 3-6 from section 24, in addition to other module signals.

The first error flip-flop 28-111 is conditioned to store a single bit error status indication in response to signal YELLOW010 generated by an inverter circuit 28-114 and a NOR circuit 28-116. NOR gate 28-116 forces signal YELLOW010 to a binary ONE when chip 28-8 forces signal SOMERR000 to a binary ZERO when signal 2ERROR00 is a binary ONE. Flip-flop 28-111 is conditioned to switch to a binary ONE when load signal LOADCP000 from the circuits 24-1 applied to its clock input terminal goes positive.

The second error flip-flop 28-112 is conditioned by load signal LOADCP000 to store a multibit error status indication in response to signal BIGRED010 generated by a NOR gate 28-118. That is, when chip 28-8 forces both signals SOMERR000 and 2ERROR000 to binary ZEROS, flip-flop 28-112 switches to a binary ONE.

Both flip-flops are reset to binary ZEROS by signal RESSTA100 applied via an AND gate 28-120 when clear signal CLEARP000 is forced to a binary ZERO by CPU 19-1.

The binary ONE output terminal signals MMYELL010 and MMREDD010 are applied to the input terminals of two stages of the 16-bit D-type latch register 28-114. An AND gate 28-122 generates hold signal DIAGLH010 in response to signals MMREDD000 and HOLDDGC00. Normally, both signals HOLDDGC00 and MMREDD000 are binary ONES. This causes AND gate 28-122 to hold signal DIAGLH010 at a binary ONE (high). A high level signal at the enable (G) input terminal of register 28-114 causes the signals at the register output terminals to follow the signals applied to the data input terminals. When AND gate 28-122 forces signal DIAGLH010 low to a binary ZERO, the input status signals applied to the data output terminals of register 28-114 are latched in the register. This freezes the contents of the register 28-114.

Freezing occurs when flip-flop 28-112 stores a multiple error indication which causes signal MMREDD000 to switch to a binary ZERO. It also can occur under the control of CPU 19-1 when signal HOLDDGC000 is switched to a binary ZERO. That is, before generating clear signal CLEARP000, the CPU 19-1 forces signal HOLDDGC000 low which latches the status information into register 28-114. After forcing clear signal CLEARP000 to a ZERO, the CPU 19-1 forces diagnostic mode signal DIAGMD000 to a binary ZERO enabling the transfer of the status signals CPOBX0011-1511 of register 28-114 to CPU lines CPOBX00-15.

The status section 28-140 of I/O port 1 is constructed in a similar fashion as section 28-110. It includes first and second error flip-flops 28-141 and 28-142 and a 16-bit status register 28-144. Error flip-flop 28-141 is conditioned to store the state of error signal YELLOW010 from chip 28-8 when load signal LOADI0000 applied to the clock input terminal goes positive. At the same time, error flip-flop 28-142 switches state in response to signal 2ERROR110.

The binary ONE output terminal signals MEMYEL010 and MEMRED010 are applied to the input terminals of two stages of register 28-144. An AND gate 28-146 operates to generate a register hold signal DIAGLHI010 in response to signal MEMRED000. When forced low, signal DIAGLHI10 causes register 24-144 to latch the input status signals into the register as described above. When an I/O controller connected to I/O port 1 forces diagnostic mode signal DIAGM-DI00 to a binary ZERO, this enables the transfer of status signals MYD000011-150011 to the data lines of system bus 14-1. The signal DIAGMDI00 is generated in response to a diagnostic command generated by the requesting I/O controller which is decoded by circuits included as part of the system bus circuits. For further information regarding the generation and decoding of such commands, reference may be made to U.S. Pat. No. 4,359,771 issued Nov. 16, 1982, which is assigned to the same assignee as named herein.

Figure 2A:
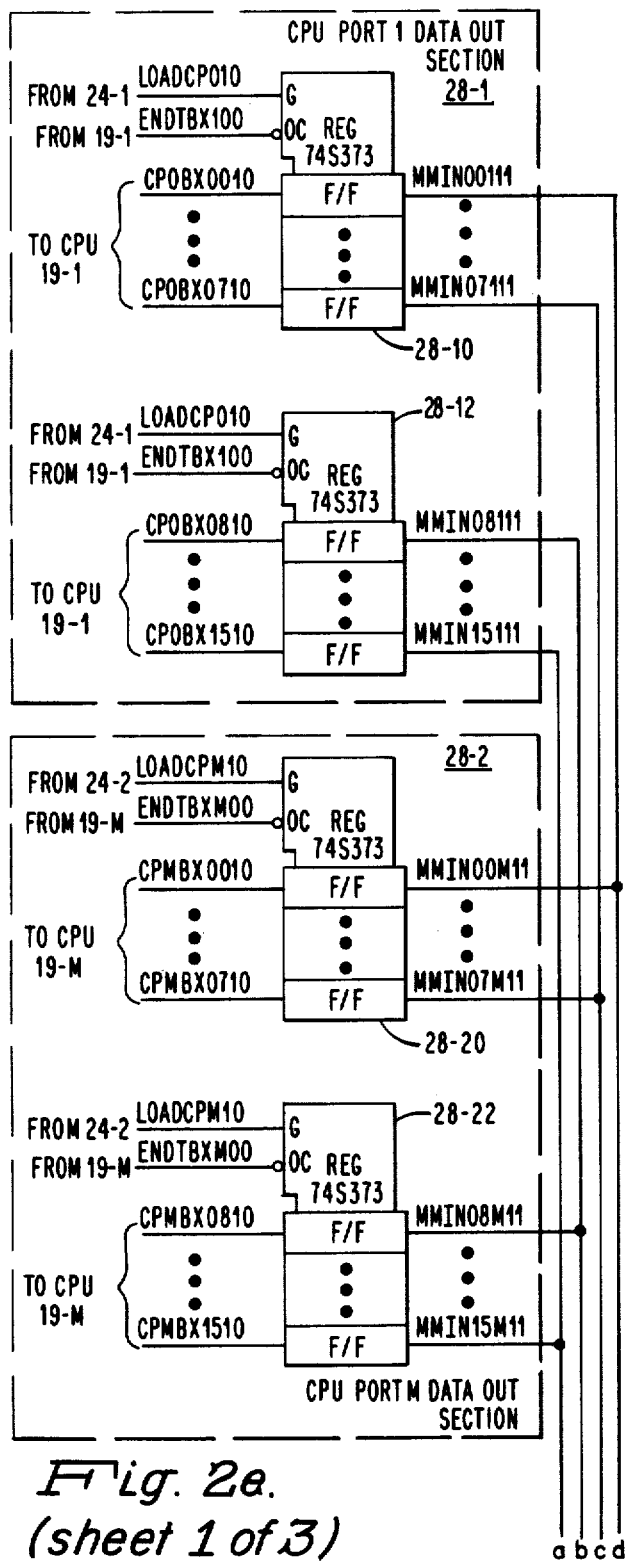
Figure 2F:
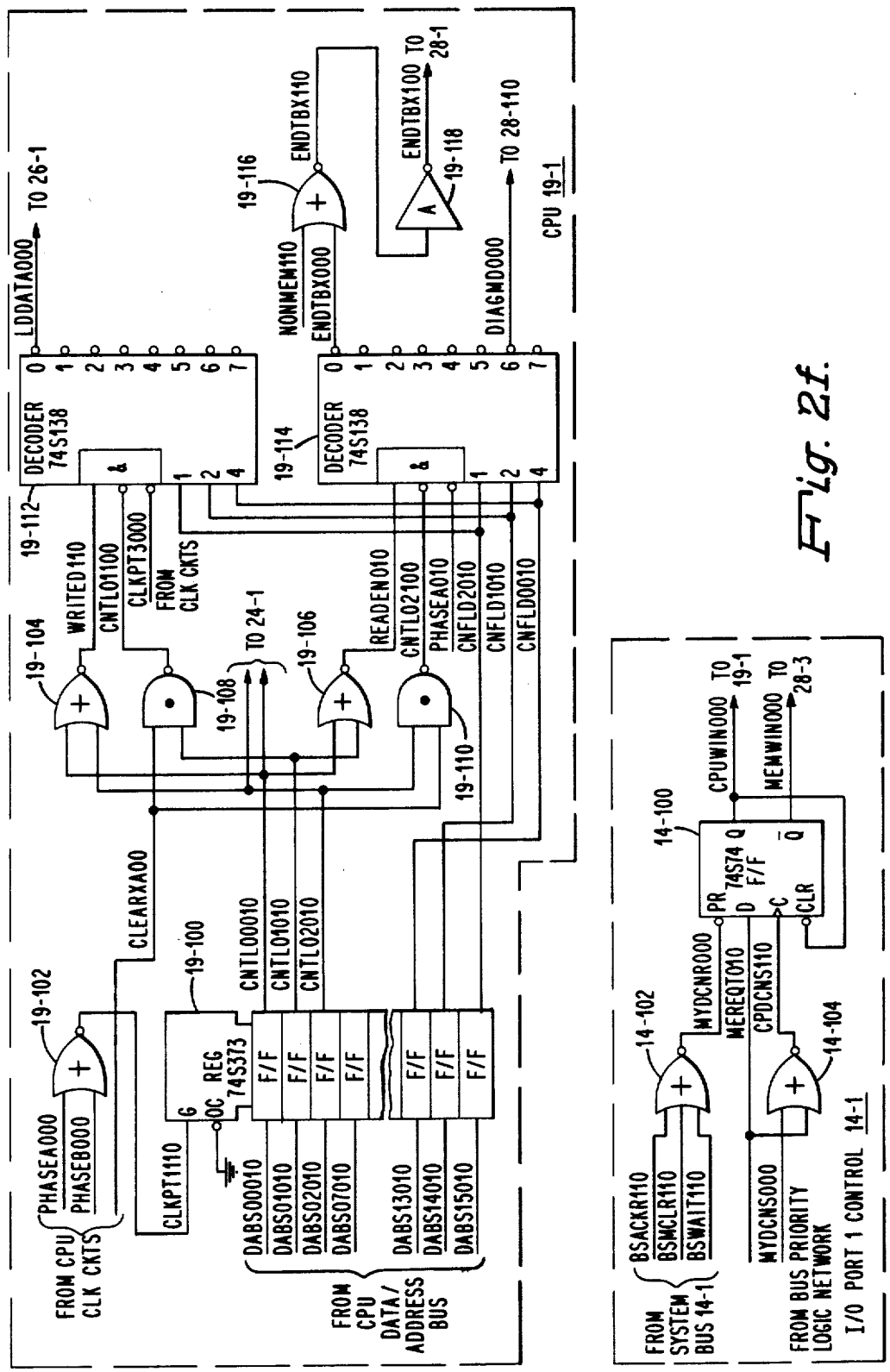

CPU AND BUS CONTROL CIRCUITS OF FIG. 2f

FIG. 2f shows portions of the control circuits included within CPU 19-1 and the bus control circuits of system bus 14-1. As shown, CPU 19-1 includes an input register 19-100 which couples to the data/address bus lines DABS00-15 of the processing unit which for the purposes of the present invention can be considered conventional in design. For example, CPU 19-1 may be organized like the microprogrammed CPU described in U.S. Pat. No. 4,340,933 which issued July 20, 1982 and is assigned to the same assignee as named herein. Under microprogram control, the processing unit applies control signals DABS00010 through DABS15010 to the input terminals of the 16-bit D-type latch register 19-100. During each CPU microinstruction cycle of operation, the states of these signals are loaded into register 19-100. Loading occurs when the processing unit clocking circuits force either clocking signal PHA- SEA000 or PHASEB000 to a binary ZERO causing a NOR gate 19-102 to force input clock signal CLKPT1110 to a binary ONE. The signals are latched into register 19-100 when both signals PHASEA000 and PHASEB000 are binary ONES. CPU 19-1 operates to generate request signal CPOREQT10 by combining several bit signals from register 19-100. More specifically, signal CPOREQT10 is generated according to the following Boolean expression.

$$\overline{CPOREQT10} = \overline{CNTL00010 \cdot (CNTL01010 \cdot \overline{CLEARXA00})}$$

As shown, different ones of control signals of register 19-100 are applied to a pair of NOR gates 19-104 and 19-106, a pair of NAND gates 19-108 and 19-110 and a pair of 3 to 8 decoder circuits 19-112 and 19-114, as shown. The decoder circuit 19-112 is enabled for operation when NOR gate 19-104 forces write enable decode signal WRITED110 to a binary ONE and NAND gate 19-108 forces control signal CNTL01100 to a binary ZERO upon clocking signal CLKPT3000 being forced to a binary ZERO by the processing unit clocking circuits. NOR gate 19-104 forces signal WRITED110 to a binary ONE when signals CNTL00010 and CNTL01910 are ZEROS. NAND gate 19-108 forces signal CNTL01100 to a binary ZERO when signals CLEARXA00 and CNTL00010 are ONES.

When enabled, decoder circuit 19-112 decodes the input signals CNFLD0010 through CNFLD2010. When the signals CNFLD0010 through CNFLD2010 are binary ZEROS, decoder circuit 19-112 forces load data signal LDDATA000 to a binary ZERO.

The decoder circuit 19-114 is enabled for operation when NOR gate 19-106 forces read enable decode signal READEN010 to a binary ONE, and NAND gate 19-110 forces control signal CTL021000 to a binary ZERO upon clocking signal PHASEA010 being forced to a binary ZERO. NOR gate 19-106 forces signal READEN010 to a binary ONE when signals CNTL00010 and CNTL01010 are binary ZEROS. NAND gate 19-110 forces signal CTL021000 to a binary ZERO when signals CLEARXA00 and CNTL02010 are binary ZEROS.

When enabled, decoder circuit 19-114 decodes input signals CNFLD0010 through CNFLD2010. When these signals have the values "000" and "110", decoder circuit 19-114 forces end of transfer signal ENDTBX000 and diagnostic mode signal DIAGMD000, respectively, to a binary ZERO. The signal ENDTBX000 is applied as an input to a NOR gate 19-116 where it is combined with a nonexistent memory signal NONMEM110 (normally a binary ZERO), and the resulting output signal ENDTBX110 is inverted by an inverter circuit 19-118.

The bus control circuits for I/O port 1 includes a winner of bus D-type flip-flop 14-100 and associated input NOR gates 14-102 and 14-104. The flip-flop 14-100 is initially set to a binary ONE state due to signal MYDCNR000 from NOR gate 14-102 having been switched to a binary ZERO at the end of a bus cycle. When memory request signal MEREQT010 applied to the flip-flop's D input terminal is forced to a binary ONE, it inhibits signal CPDCNS110 applied to the flip-flop's C input terminal from being switched positive. When signal MEREQT010 is a binary ZERO (i.e., no I/O bus request), NOR gate 14-104 switches signal CPDCNS110 positive, in response to signal MYDCNS000 enabling flip-flop 14-100 to be switched to a binary ZERO. This enables the CPU associated with system bus 14-1 to transfer data to the system bus data lines.

The memory request signal MEREQT010 is generated as a function of the I/O port load signal LOADI0010 and a bus busy signal BSBUSY000 generated by other circuits included within the bus control circuits. When the bus is not busy (i.e., signal BSBUSY000 = 1) and I/O port 1 forces load signal LOADI0010 to a binary ONE, signal MEREQT010 is switched to a binary ONE. This in turn holds flip-flop 14-100 in a set state wherein signal MEMWIN000 remains a binary ZERO enabling memory system 20 to transfer data to the requesting I/O controller.

At the end of the bus cycle, when a response is received from system bus 14-1 (i.e., signal BSACKR110, BSMCLR111 or BSWAIT110 is forced to a binary ONE), NOR gate 14-102 forces signal MYDCNR000 to a binary ZERO which sets flip-flop 14-100 to a binary ONE state.

For further information regarding the operation of the bus priority circuits, reference may be made to the related copending patent application "Distributed Priority Network Logic for Allowing a Low Priority Unit to Reside in a High Priority Position".

DESCRIPTION OF OPERATION

With reference to FIGS. 1 through 2f, the operation of the memory system 20 will now be described. It is assumed that both an I/O controller connected to system bus 14-1 and the CPU 19-1 make requests to access memory system 20. These requests can occur simultaneously without affecting system operation and result in CPU 19-1 and the I/O controller asynchronously forcing signals CPOREQT10 and IOOREQT10 to binary ONES. At the same time, CPU 19-1 operates to force memory reference signal MEMREF000 positive while at the same time it applies control and address signals to its bus lines CPBXOA-OD and CPBX00-15, in addition to lines CNTL001 and CNTL002.

Signal MEMREF000 conditions CPU port 1 control register 24-10 of FIG. 2c and CPU address registers 23-10 and 23-12 to store the states of the control and address signals of the memory request. It will be assumed that CPU 19-1 has specified a memory write operation wherein a complete 16-bit data word is to be written into the memory address of the request/command loaded into the port 1 control and address sections 24-1 and 23-1, respectively. CPU 19-1 operates to force memory request signal MEMREF000 to a binary ONE state. This enables the address and control signals applied to section 24-1 to be loaded into register 24-10. Also, it enables the row and column addresses to be loaded into registers 23-10 and 23-12 of section 23.

Since it is a nonbyte write operation, CPU 19-1 will have forced signals CNTL00110 (memory write) and CNTL00210 (byte) to a binary ONE and a binary ZERO, respectively.

Additionally, since this is a write command, CPU 19-1 causes NOR gate 19-104 of FIG. 2f to force write enable decode signal WRITED110 to a binary ONE. Signal WRITED110 together with signals CNTL01100 and CLKPT3000 enable decoder 19-112 to decode an all ZERO pattern applied to its input data terminals by register 19-100. This results in load data signal LDDATA000 being switched from a binary ONE to a binary ZERO. As seen from FIG. 2d, this causes the data signals CPOBX0010-1510 applied by CPU 19-1 to be latched into registers 26-10 and 26-12 of data in section 26-1 when signal LDDATA000 goes positive. However, since signals CPOBYT000 and CPOBYT100 are held at binary ONES by the byte control circuits 24-100 of FIG. 2c, the data contents of registers 26-10 and 26-12 are inhibited from being applied to the memory data in bus until CPU 19-1 has been granted access to memory system 20.

In a similar fashion, when the requesting I/O controller forces its request signal IOOREQT10 to a binary ONE, it also asynchronously forces bus memory reference line BSMREF to a binary ONE state denoting its request for a memory cycle. This results in the bus memory response circuits of bus 14-1 forcing memory acknowledgement signal MEACKR710 to a binary ONE (positive). Here, it is assumed that there is no memory request pending for I/O port 1, in which case signal MIOBUSY10 from the priority circuits 21-1 is a binary ZERO and that the requesting I/O controller has been granted access to the bus (i.e., memory system 20 is not transferring data to another I/O controller connected to system bus 14-1).

When signal MEACKR710 goes positive, the control and address signals of the memory request applied to the address and control lines of system bus 14-1 by the requesting I/O controller are loaded into the control register 24-30 of port control section 24-3 of FIG. 2c and into the address registers 23-30 and 23-32 of port address section 23-3 of FIG. 2b. It will be assumed that the requesting I/O controller has specified a memory read operation wherein a complete 16-bit data word is to be read out and transferred to the I/O controller. Since it is a read operation, the I/O controller will have forced bus signals BSWRIT110 and BSBYTE110 to binary ZEROS.

In response to the requests, the priority circuits 21-1 operate to begin a priority resolution cycle of operation. Early in the cycle, the circuits 21-1 force memory cycle signal MCYCLE010 to a binary ONE signalling the start of the memory cycle. At that time, the priority circuits 21-1 operate to switch the busy signals MCOBUSY10 and MIOBUSY10 to binary ONES. The signal MIOBUSY10 indicates that the memory is in the process of performing the operation. Signal MCOBUSY10 indicates that the memory has other requests and the CPU port 1 request has not yet become the highest priority memory request pending. As discussed in the related copending application "Priority Resolver with Lowest Priority Level Having Shortest Logic Path", the early signalling of the start of a memory cycle allows the memory system 20 to begin a memory cycle even before the requestor which is ultimately granted priority is determined.

As seen from FIG. 2a, signal MCYCLE010 causes the delay line timing generator circuits 21-4 to generate a sequence of timing signals for performing the memory cycle of operation. The priority circuits 21-1 operate to force CPU and I/O grant signals CPOGRNT10 and IOOGRNT10 to binary ONES in response to the requests. It is assumed that there is no refresh request and therefore signal RFGRNT010 remains a binary ZERO.

The combination of grant signals from circuits 21-1 cause only NAND gate 24-32 of section 24-3 of FIG. 2c to force control signal IOOCNTL00 to a binary ZERO. This causes control register 24-30 to apply its control and address contents to its output terminals. This in turn enables the decoding of the module/row address signals and the conditioning of the byte control circuits of FIG. 2c associated with I/O port 1. That is, since the I/O request specifies a read operation, NOR gate 24-112 forces signal WORDWT010 to a binary ZERO while partial write signal CYCTW0000 remains a binary ONE. This forces byte write signals WTBYT0010 and WTBYT1010 to binary ZEROS. Accordingly, the NAND/NOR gates 24-105 and 24-106 are only partially enabled by the binary ONE state of I/O grant signal IOOGRNT10 causing signals IOOBYT000 and IOOBYT100 to remain binary ONES.

At the start of the memory cycle, the negative going timing pulse signal DLY020000 conditions AND gate 21-20 to generate row address strobe signal MRASTS010 for a period of approximately 250 nanoseconds. This signal enables the row address portion of the memory command to be strobed into the selected module or row of chips of RAM circuits 22. Also, since at the beginning of the memory cycle, signal DLY060000 is a binary ONE, inverter circuit 21-26 forces row address time signal RASTME010 to a binary ONE.

Signal RASTME010 partially conditions NAND gates 21-31, 21-34, 21-37 and 21-39 within the CPU and I/O port sections of FIG. 2a. The different combinations of grant signals establish the complete conditioning of one of these gates as specified by priority circuits 21-1. In this case, NAND gate 21-37 is conditioned by signal IOOGRNT10 to force signal MRASIO000 to a binary ZERO. At the same time, the complement signal IOOGRNT00 inhibits NAND gate 21-31 from forcing signal MRASCP000 to a binary ZERO in response to grant signal CPOGRNT10 being forced to a binary ONE. This causes the row address contents of address register 23-30 of address section 23-3 to be applied to the selected module/row of chips of RAM circuits 22 via the memory address bus whereupon they are strobed into the chips by signal MRASTS010.

Next, the timing circuits 21-2 operate to generate negative going timing DLY060000 which causes AND gate 21-24 to force column address signal CASTME010 to a binary ONE. Signal CASTME010 partially conditions NAND gates 21-30, 21-33, 21-36 and 21-38 within the CPU and I/O port sections. NAND gate 21-37 is fully enabled by grant signal IOOGRNT10 to force signal MCASI0000 to a binary ZERO. At the same time, the compement signal IOOGRNT00 inhibits NAND gate 21-30 from forcing signal MCASCP000 to a binary ZERO in response to grant signal CPOGRNT10 being forced to a binary ONE.

Also, signal MCASI0000 causes the column address contents of address register 23-32 of address section 23-3 to be applied to the selected row of chips of RAM circuits 22 via the memory address bus. The column address is latched in the chips in response to column address strobe signal MCASTS010 being generated. This occurs when the generator 21-4 generates negative going pulse signal DLY100000 which causes AND gate 21-22 to force signal MCASTS010 positive. Signal MCASTS010 is generated approximately 100 nanoseconds after the start of a memory cycle or after the start of signal MRASTS010 for a period of approximately 220 nanoseconds.

During the read cycle of operation, the RAM circuits 22 read out a 16-bit word from the location of the selected row of chips specified by the memory row and column addresses. The 16-bit data word is applied to the driver circuits 28-5 and 28-6 along with six check bits applied to the driver circuits 28-7. When the timing generator circuits force signal ENABLE000 to a binary ZERO in response to negative going timing signals DLY080000 and DLY200000, the driver circuits 28-5 and 28-6 operate to apply the data word to the data out sections 28-1 through 28-4 in addition to EDAC chip 28-8. Since this is a read cycle, signal WTMODE000 is a binary ONE while signals ENBYT0000 and ENNBYT1000 are binary ZEROS. This causes EDAC chip 28-8 to operate in the correction mode and to apply both corrected bytes to the chip's byte data terminals along with generating the appropriate error and multierror signals SOMERR000 and 2ERROR000.

As seen from FIG. 2c, since control section 24-3 of I/O port 1 specifies a read, signal MMWRIT010 is a binary ZERO. This in turn forces the J input terminal of each of the load flip-flops of sections 24-1 through 24-4 to be a binary ONE. Thus, when timing signal MCASI0000 is forced to a binary ZERO, this causes I/O load flip-flop 24-34 to switch to a binary ONE forcing signal LOADI0010 to a binary ONE and signal LOADI0000 to a binary ZERO. When a binary ONE, signal LOADI0010 enables the I/O data out registers of section 28-3 to be loaded with memory data. Signal LOADI0000 when a binary ZERO prevents the storage of status information within the I/O port 1 status section 28-140.

When signal MCASI0000 switches to a binary ZERO, it enables the priority circuits 21-1 to reset the I/O port 1 ask flip-flop. This permits the I/O port 1 which was granted priority to initiate another request upon the completion of the memory read operation.

When a binary ONE, signal LOADI0010 causes the I/O port 1 system bus control circuits 14-1 to request access to bus 14-1. When the bus 14-1 is available (not busy), this results in memory request signal MEREQT010 being switched to a binary ONE. Assuming that is the case, signal MEREQT010 switches to a ONE holding bus winner flip-flop 14-100 in a binary ONE state by inhibiting clocking signal CPDCNS110 from going positive.

During the read memory cycle, data valid flip-flop 21-48 is set as a function of error signal SOMERR000 from EDAC chip 28-8, in response to the negative going timing pulse DLY280000. When there is no error indicating that the data word read out from memory is correct, signal SOMERR000 switches the data valid flip-flop 21-48 to a binary ONE. This, in turn, resets the I/O load flip-flop 24-34 to a binary ZERO forcing signal LOADI0010 to a binary ZERO. When being switched to a ZERO, the memory data word is latched into the output registers 28-30 and 28-32. Also, at that time, the states of error status signals YELLOW010 and BIGRED010 are latched into error flip-flops 28-141 and 28-142. When a single or double bit error is detected, signal SOMERR000 causes data valid flip-flop 21-48 to remain at a binary ZERO. In the case of a single bit error, EDAC chip 28-8 operates to generate the corrected data word at its data terminals while forcing signal YELLOW010 to a binary ONE. However, when a multiple error is detected, EDAC chip 28-8 forces error signal 2ERROR000 to a binary ZERO which, in turn, forces signal BIGRED010 to a binary ONE.

When negative going timing pulse signal DLY120000 switches positive (420 nanoseconds after the start of the cycle) following the generation of negative going timing pulse DLY220000, NAND gate 21-42 operates to force signal STDVAL000 to a binary ZERO. This switches data valid flip-flop 21-48 to a binary ONE which resets the I/O load flip-flop. At that time, the corrected data word (i.e., single bit error) or uncorrected data word (i.e., multiple error) is latched into the data out registers. At the same time, the status of signals YELLOW010 and BIGRED010 are latched into flip-flops 28-141 and 28-142.

When signal STDVAL000 switches to a binary ZERO, this causes the priority circuits 21-1 to reset the grant flip-flops during nonbyte write memory cycles of operation. However, since the CPU memory port 1 ask flip-flop is still set due to the outstanding request, it remains a binary ONE. As soon as the I/O port 1 grant flip-flop resets, the priority circuits 21-1 operate to force I/O port 1 memory busy signal MIOBUSY10 to a binary ZERO. This indicates to the requesting controller that the requested data word has been transferred and that memory system 20 is not busy. At this time, the priority circuits 21-1 are able to start another priority resolution cycle.

The states of the error flip-flops 28-141 and 28-142 are applied to the BSYELO and BSREDD lines of the system bus 14-1 together with the 16-bit data word corresponding to signals MYD000010-150010 applied to the bus data lines via driver circuits (not shown) by registers 28-30 and 28-32 of section 28-3 which are conditioned by the binary ZERO state of signal MEMWIN000. Also, signal MEREQT010 causes the generation of a signal MYDCNN010 which enables the driver circuits for transferring the data contents of output registers 28-30 and 28-32 to system bus 14-1 applied in response to signal MEMWIN000 during the second half of a system bus cycle of operation. At the end of the system bus cycle, the requesting I/O controller acknowledges the data word transfer by forcing signal BSACKR110 to a binary ONE. This enables flip-flop 14-100 to be set to a binary ONE. This completes the processing of the I/O controller memory request. However, in the case of an error, the requesting I/O controller can issue a diagnostic command which will enable it to read out the unique contents of its status section register 28-144 via the data lines of system bus 14-1.

It will be appreciated that even before the I/O controller has taken the requested data word, the memory system 20 is able to begin another cycle enabling parallel operation of I/O and CPU memory ports. Thus, no matter how slow the I/O controller is in operating this does not affect system performance due to the asynchronous operation of each CPU and I/O port.

Since CPU 19-1 still has an outstanding request (i.e., its ask flip-flop was set in response to signal CPOREQT10), the priority circuits 21-1 are operative to switch its grant flip-flop to a binary ONE. This forces grant signals CPOGRNT10 and CPOGRNT00 to a binary ONE and binary ZERO, respectively. CPU memory busy signal MCOBUSY10 remains a binary ONE indicating that memory system 20 has not completed its processing of the CPU write request. Upon the switching of grant signal CPOGRNT10 to a binary ONE, the priority circuits 21-1 force signal MCYCLE010 to a binary ONE. Signal MCYCLE010 causes the timing generator 21-4 to initiate another sequence of timing signals required for performing a memory cycle of operation. In response to signal MCYCE010, timing generator 21-4 forces signal DLYSTR000 to a binary ZERO which resets data valid flip-flop 21-48 to a binary ZERO.

At the start of the memory cycle, the negative going timing pulse signal DLY020000 conditions AND gate 21-20 to generate row address strobe signal MRASTS010 for a period of approximately 250 nanoseconds. This signal enables the row address portion of the CPU memory write command to be strobed into the selected module or row of chips of RAM circuits 22. Also, since at the beginning of the memory cycle, signal DLY060000 is a binary ONE, inverter circuit 21-26 forces row address time signal RASTME010 to a binary ONE.

Signal RASTME010 partially conditions NAND gates 21-31, 21-34, 21-37 and 21-39 within the CPU and I/O port sections of FIG. 2a. The different combinations of grant signals establish the complete conditioning of one of these gates as specified by priority circuits 21-1. In this case, NAND gate 21-31 is conditioned by signals CPOGRNT10, RFGRNT100, IOOGRNT00 and IONGRNT00 to force signal MRASCP000 to a binary ZERO. This causes the row address contents of address register 23-10 of address section 23-1 to be applied to the selected module/row of chips of RAM circuits 22 via the memory address bus whereupon they are strobed into the chips by signal MRASTS010.

Next, the timing circuits 21-2 operate to generate negative going timing DLY060000 which causes AND gate 21-24 to force column address timing signal CASTME010 to a binary ONE. Signal CASTME010 partially conditions NAND gates 21-30, 21-33, 21-36 and 21-38 within the CPU and I/O port sections. NAND gate 21-30 is fully enabled by grant signals CPOGRNT10 through IONGRNT00 force signal MCASCP000 to a binary ZERO.

Signal MCASI0000 causes the column address contents of address register 23-12 of address section 23-1 to be applied to the selected row of chips of RAM circuits 22 via the memory address bus. The column address is latched in the chips in response to column address strobe signal MCASTS010 being generated. This occurs when the generator 21-4 generates negative going pulse signal DLY100000 which causes AND gate 21-22 to force signal MCASTS010 positive. Signal MCASTS010 is generated approximately 100 nanoseconds after the start of a memory cycle or after the start of signal MRASTS010 for a period of approximately 220 nanoseconds.

As discussed above, CPU 19-1 previously loaded its control and address section registers 24-10, 23-10 and 23-12 with control and address signals of the memory nonbyte write command/request. During this memory cycle, the combination of grant signals from circuits 21-1 cause only NAND gate 24-12 of section 24-1 of FIG. 2c to force control signal CPOCNTL00 to a binary ZERO. This causes control register 24-10 to apply its control and address contents to its output terminals. This in turn enables the decoding of the module/row address signals and the conditioning of the byte control circuits of FIG. 2c associated with CPU port 1. That is, since the CPU request specifies a write operation, NOR gate 24-112 forces signal WORDWT010 to a binary ONE while partial write signal CYCTW0000 remains a binary ONE. This forces byte write signals WTBYT0010 and WTBYT1010 to binary ZEROS.

The combination of grant signals cause AND gate 24-120 to force CPU control signal CPOCNTL10 to a binary ONE. Accordingly, the top AND gate of gates 24-101 and 24-102 are fully enabled by signals WORDWT010 and CPOCNTL10. This causes signals CPOBYT000 and CPOBYT100 to switch to binary ZEROS.

As seen from FIG. 2d, signals CPOBYT000 and CPOBYT100 condition registers 26-10 and 26-12 to apply their data contents to memory the data in bus. Also, write mode signal WTMODE000 is forced to a binary ZERO while signals ENBYT0000 and ENBYT1000 remain at binary ONES, since a nonbyte write operation is being performed. Accordingly, EDAC chip 28-8 is conditioned to generate the required six check bit signals CHBIT0010 through CHBIT5010 which are written into the addressed storage location of the selected module/row of RAM circuits 22 along with the 16-bit data word.

When signal MCASCP000 switches to binary ZERO, it enables the priority circuits reset the CPU port 1 ask flip-flop. This permits the CPU port 1 which was granted priority to initiate another request upon the completion of the memory write operation.

During the memory cycle, timing generator circuit 21-4 operates to generate negative going timing pulse signal DLY220000. This in turn causes NAND gate 21-42 to force signal STDVAL000 to a binary ZERO. This causes the priority circuits 21-1 to reset the grant flip-flops during nonbyte write memory cycles of operation. As soon as the CPU port 1 grant flip-flop resets, the priority circuits 21-1 operate to force CPU port 1 memory busy signal MCOBUSY10 to a binary ZERO. This indicates to the CPU 19-1 that the memory system 20 has completed the write request. At this time, the priority circuits 21-1 are able to start another priority resolution cycle.

It will be assumed that the same sequence of memory read and write commands are received from CPU 19-1 and system bus 14-1 with the exception that it is the I/O controller which is the source of the write command while CPU 19-1 is the source of the read command. Accordingly, when the commands are applied to memory system 20, CPU 19-1 and the I/O controller asynchronously force signals CPOREQT10 and IOOREQT10 to binary ONES.

In the same manner as described above, the address and control signals of the memory write command are loaded into the control and address registers of sections 23-3 and 24-3 in response to memory acknowledgement signal MEACKR710 being generated by the bus circuits 14-1. At the same time, signal MEACKR710 enables the data word applied to the data lines of system bus 14-1 to be loaded into the data in registers 26-30 and 26-32 of I/O port 1 input data section 26-3.

Signal MEACKR710 is also applied to the bus acknowledge control line BSACKR of system bus 14-1 to acknowledge the receipt of the command request. This signal enables the requesting I/O controller to proceed with other operations characteristic of the asynchronous operation of system bus 14-1.

In parallel with the above, CPU 14-1 forces memory reference signal MEMREF000 positive which loads the control and address signals of its memory read request/command into the control and address registers 24-10, 23-10 and 23-12 of sections 24-1 and 23-1, respectively. In response to the CPU and I/O requests, the priority circuits 21-1 operate to begin a priority resolution cycle of operation. Early in the cycle, the circuits 21-1 force memory cycle signal MCYCLE010 to a binary ONE signalling the start of the memory cycle. At that time, the priority circuits 21-1 operate to switch the busy signals MCOBUSY10 and MIOBUSY10 to binary ONES. The signal MIOBUSY10 indicates that the memory is in the process of performing the operation for the I/O controller. Signal MCOBUSY10 indicates that the memory has other requests and the CPU port 1 request has not yet become the highest priority memory request pending.

As soon as CPU 19-1 detects that memory busy signal MCOBUSY10 has been forced to a binary ONE, it is able to proceed with carrying out other tasks, until memory system 20 signals CPU 19-1 that it has completed the processing of the read command (i.e., signal MCOBUSY10 is returned to a ZERO). This is particularly desirable in those instances where the read command has requested a data word which is not needed (i.e., data preread or prefetch operation) for continued processing. Thus, the arrangement of the invention permits CPU processing to proceed to the extent possible thereby improving system performance.

As seen from FIG. 2a, signal MCYCLE010 causes the delay line timing generator circuits 21-4 to generate a sequence of timing signals for performing the memory write cycle of operation. The priority circuit 21-1 operate to force CPU and I/O grant signals CPOGRNT10 and IOOGRNT10 to binary ONES in response to the requests. Again, it is assumed that there is no refresh request and therefore signal RFGRNT010 remains a binary ZERO.

The combination of grant signals from circuits 21-1 cause only NAND gate 24-32 of section 24-3 of FIG. 2c to force control signal IOOCNTL00 to a binary ZERO. This causes control register 24-30 to apply its control and address contents to its output terminals. This, in turn, enables the decoding of the module/row address signals and the conditioning of the byte control circuits of FIG. 2c associated with I/O port 1. That is, since the I/O request specifies a write operation, NOR gate 24-112 forces signal WORDWT010 to a binary ONE while partial write signal CYCTW0000 remains a binary ONE. This forces byte write signals WTBYT0010 and WTBYT1010 to binary ZEROS. Accordingly, the NAND/NOR gates 24-105 and 24-106 are completely enabled by the binary ONE state of I/O grant signal IOOGRNT10 causing signals IOOBYT000 and IOOBYT100 to switch to binary ZEROS. This causes input data registers 26-30 and 26-32 of section 26-3 to apply their data word contents to the memory data in bus.

At the start of the memory cycle, the negative going timing pulse signal DLY020000 conditions AND gate 21-20 to generate row address strobe signal MRASTS010 for a period of approximately 250 nanoseconds. This signal enables the row address portion of the memory command to be strobed into the selected module or row of chips of RAM circuits 22. Also, since at the beginning of the memory cycle, signal DLY060000 is a binary ONE, inverter circuit 21-26 forces row address time signal RASTME010 to a binary ONE.

Signal RASTME010 partially conditions NAND gates 21-31, 21-34, 21-37 and 21-39 within the CPU and I/O port sections of FIG. 2a. The different combinations of grant signals establish the complete conditioning of one of these gates as specified by priority circuits 21-1. In this case, NAND gate 21-37 is conditioned by signal IOOGRNT10 to force signal MRASI0000 to a binary ZERO. At the same time, the complement signal IOOGRNT00 inhibits NAND gate 21-31 from forcing signal MRASCP000 to a binary ZERO in response to grant signal CPOGRNT10 being forced to a binary ONE. This causes the row address contents of address register 23-30 of the address section 23-3 to be applied to the selected module/row of chips of RAM circuits 22 via the memory address bus whereupon they are strobed into the chips by signal MRASTS010.

Next, the timing circuits 21-2 operate to generate negative going timing DLY060000 which causes AND gate 21-24 to force column address signal CASTME010 to a binary ONE. Signal CASTME010 partially conditions NAND gates 21-30, 21-33, 21-36 and 21-38 within the CPU and I/O port sections. NAND gate 21-37 is fully enabled by grant signal IOOGRNT10 to force signal MCASI0000 to a binary ZERO. At the same time, the complement signal IOOGRNT00 inhibits NAND gate 21-30 from forcing signal MCASCP000 to a binary ZERO in response to grant signal CPOGRNT10 being forced to a binary ONE.

Also, signal MCASI0000 causes the column address contents of address register 23-32 of address section 23-3 to be applied to the selected row of chips of RAM circuits 22 via the memory address bus. The column address is latched in the chips in response to column address strobe signal MCASTS010 being generated. This occurs when the generator 21-4 generates negative going pulse signal DLY10000 which causes AND gate 21-22 to force signal MCASTS010 positive. Signal MCASTS010 is generated approximately 100 nanoseconds after the start of a memory cycle or after the start of signal MRASTS010 for a period of approximately 220 nanoseconds.

Also, write mode signal WTMODE000 is forced to a binary ZERO while signals ENBYT0000 and ENBYT10000 remain at binary ONES, since a nonbyte write operation is being performed. Accordingly, EDAC chip 28-8 is conditioned to generate the required six check bit signals CHBIT0010 through CHBIT5010 which are written into the addressed storage location of the selected module/row of RAM circuits 22 along with the I/O controller's 16-bit data word.

When signal MCASCP000 switches to a binary ZERO, it enables the priority circuits to reset the I/O port 1 ask flip-flop. This permits the I/O port 1 which was granted priority to initiate another request upon the completion of the memory write operation.

During the memory cycle, timing generator circuit 21-4 operates to generate negative going timing pulse signal DLY220000. This, in turn, causes NAND gate 21-42 to force signal STDVAL000 to a binary ZERO. This causes the priority circuits 21-1 to reset the grant flip-flops during nonbyte write memory cycles of operation. However, since the CPU port 1 ask flip-flop is still set due to the outstanding request, it remains a binary ONE.

As soon as the I/O port 1 grant flip-flop resets, the priority circuits 21-1 operate to force I/O port 1 memory busy signal MIOBUSY10 to a binary ZERO. This indicates to the I/O controller that the memory system 20 has completed the write request. At this time, the priority circuits 21-1 are able to start another priority resolution cycle.

Since CPU 19-1 still has an outstanding request (i.e., its ask flip-flop was set in response to signal CPOREQT10), the priority circuits 21-1 are operative to switch its grant flip-flop to a binary ONE. This forces grant signals CPOGRNT10 and CPOGRNT00 to a binary ONE and binary ZERO, respectively. CPU memory busy signal MCOBUSY10 remains a binary ONE indicating that memory system 20 still has not completed its processing of the CPU read request. Upon the switching of grant signal CPOGRNT10 to a binary ONE, the priority circuits 21-1 force signal MCYCLE010 to a binary ONE. Signal MCYCLE010 causes the timing generator 21-4 to initiate another sequence of timing signals required for performing a memory cycle of operation. In response to signal MCYCE010, timing generator 21-4 forces signal DLYSTR000 to a binary ZERO which resets data valid flip-flop 21-48 to a binary ZERO.

At the start of the memory cycle, the negative going timing pulse signal DLY020000 conditions AND gate 21-20 to generate row address strobe signal MRASTS010 for a period of approximately 250 nanoseconds. This signal enables the row address portion of the CPU memory read command to be strobed into the selected module or row of chips of RAM circuits 22. Also, since at the beginning of the memory cycle, signal DLY060000 is a binary ONE, inverter circuit 21-26 forces row address time signal RASTME010 to a binary ONE.

Signal RASTME010 partially conditions NAND gates 21-31, 21-34, 21-37 and 21-39 within the CPU and I/O port sections of FIG. 2a. The different combinations of grant signals establish the complete conditioning of one of these gates as specified by priority circuits 21-1. In this case, NAND gate 21-31 is conditioned by signals CPOGRNT10, RFGRNT100, IOOGRNT00 and IONGRNT00 to force signal MRASCP000 to a binary ZERO. This causes the row address contents of address register 23-10 of address section 23-1 to be applied to the selected module/row of chips of RAM circuits 22 via the memory address bus whereupon they are strobed into the chips by signal MRASTS010.

Next, the timing circuits 21-2 operate to generate negative going timing DLY060000 which causes AND gate 21-24 to force column address timing signal CASTME010 to a binary ONE. Signal CASTME010 partially conditions NAND gates 21-30, 21-33, 21-36 and 21-38 within the CPU and I/O port sections. NAND gate 21-30 is fully enabled by grant signals CPOGRNT10 through IONGRNT00 which forces signal MCASCP000 to a binary ZERO.

Signal MCASI0000 causes the column address contents of address register 23-12 of address section 23-1 to be applied to the selected row of chips of RAM circuits 22 via the memory address bus. The column address is latched in the chips in response to column address strobe signal MCASTS010 being generated. This occurs when the generator 21-4 generates negative going pulse signal DLY100000 which causes AND gate 21-22 to force signal MCASTS010 positive.

As discussed above, CPU 19-1 previously loaded its control and address section registers 24-10, 23-10 and 23-12 with control and address signals of the memory read command/request. During this memory cycle, the combination of grant signals from circuits 21-1 cause only NAND gate 24-12 of section 24-1 of FIG. 2c to force control signal CPOCNTL00 to a binary ZERO. This causes control register 24-10 to apply its control and address contents to its output terminals. This, in turn, enables the decoding of the module/row address signals and the conditioning of the byte control circuits of FIG. 2c associated with CPU port 1. That is, since the CPU request specifies a read operation, NOR gate 24-112 forces signal WORDWT010 to a binary ZERO while partial write signal CYCTW0000 remains a binary ONE. This forces byte write signals WTBYT0010 and WTBYT1010 to binary ZEROS.

The combination of grant signals cause AND gate 24-120 to force CPU control signal CPOCNTL10 to a binary ONE. Accordingly, the top AND gate of gates 24-101 and 24-102 are only partially enabled by signals WORDWT010 and CPOCNTL10. This causes signals CPOBYT000 and CPOBYT100 to remain binary ONES.

During the read cycle of operation, the RAM circuits 22 read out a 16-bit word from the location of the selected row of chips specified by the memory row and column addresses. The 16-bit data word is applied to the driver circuits 28-5 and 28-6 along with six check bits applied to the driver circuits 28-7. When the timing generator circuits force signal ENABLE000 to a binary ZERO in response to negative going timing signals DLY080000 and DLY200000, the driver circuits 28-5 and 28-6 operate to apply the data word to the data out sections 28-1 through 28-4 in addition to EDAC chip 28-8. Since this is a read cycle, signal WTMODE000 is a binary ONE while signals ENBYT0000 and ENBYT1000 are binary ZEROS. This causes EDAC chip 28-8 to operate in the correction mode and to apply both corrected bytes to the chip's byte data terminals along with generating the appropriate error and multierror signals SOMERR000 and 2ERROR000.

Additionally, since this is a read command, CPU 19-1 causes NOR gate 19-106 of FIG. 2f to force read enable decode signal READEN010 to a binary ONE. Signal READEN010 together with signals CTL021000 and PHASE010 enable decoder 19-114 to decode an all ZERO pattern applied to its input data terminals by register 19-100 when appropriately loaded by CPU 19-1. At that time, signal ENDTBX100 is switched from a binary ONE to a binary ZERO. Signal ENDTBX100 when a binary ZERO enables the data out registers 28-10 and 28-12 of section 28-1 to apply their data word contents read from RAM circuits 22 to lines CPOBX00-15 of CPU 19-1.

As seen from FIG. 2c, since control section 24-1 of CPU port 1 specifies a read, signal MMWRIT010 is a binary ZERO. This, in turn, forces the J input terminal of each of the load flip-flops of sections 24-1 through 24-4 to be a binary ONE. Thus, when timing signal MCASI0000 is forced to a binary ZERO, this causes CPU load flip-flop 24-14 to switch to a binary ONE forcing signal LOADCP010 to a binary ONE and signal LOADCP000 to a binary ZERO, respectively. When a binary ONE, signal LOADCP010 enables the CPU data out registers of section 28-1 to be loaded with memory data. Signal LOADCP000 when a binary ZERO prevents the storage of status information within the CPU port 1 status section 28-110.

When signal MCASI0000 switches to a binary ZERO, it enables the priority circuits 21-1 to reset the CPU port 1 ask flip-flop. This permits CPU port 1 which was granted priority to initiate another request upon the completion of the memory read operation.

During the read memory cycle, data valid flip-flop 21-48 is set as a function of error signal SOMERR000 from EDAC chip 28-8 in response to the negative going timing pulse DLY280000. When there is no error indicating that the data word read out from memory is correct, signal SOMERR000 switches the data valid flip-flop 21-48 to a binary ONE. This, in turn, resets the CPU load flip-flop 24-14 to a binary ZERO forcing signal LOADCP010 to a binary ZERO. When being switched to a ZERO, the memory data word is latched into the output registers 28-10 and 28-12. Also, at that time, the states or error status signals YELLOW010 and BIGRED010 are latched into error flip-flops 28-111 and 28-112. When a single or double bit error is detected, signal SOMERR000 causes data valid flip-flop 21-48 to remain at a binary ZERO. In the case of a single bit error, EDAC chip 28-8 operates to generate the corrected data word at its data terminals while forcing signal YELLOW010 to a binary ONE. However, when a multiple error is detected, EDAC chip 28-8 forces error signal 2ERROR000 to a binary ZERO which, in turn, forces signal BIGRED010 to a binary ONE. When negative going timing pulse signal DLY120000 switches positive (420 nanoseconds after the start of the cycle) following the generation of negative going timing pulse DLY220000, NAND gate 21-42 operates to force signal STDVAL000 to a binary ZERO. This switches data valid flip-flop 21-48 to a binary ONE which resets the CPU load flip-flop 24-14. At that time, the corrected data word (i.e., single bit error) or uncorrected data word (i.e., multiple error) is latched into the data out registers. At the same time, the status of signals YELLOW010 and BIGRED010 are latched into flip-flops 28-111 and 28-112.

In the event of a multiple error condition, CPU 19-1 can obtain complete status information by loading register 19-100 with an appropriate value which causes a pattern of "110" to be applied to the data terminals of decoder 19-114. This results in signal DIAGMD000 being forced to a binary ZERO enabling the contents of status register 28-114 of section 28-110 to be transferred to CPU 19-1.

When signal MCASCP000 switches to binary ZERO, it enables the priority circuits to reset the CPU port 1 ask flip-flop. This permits the CPU port 1 which was granted priority to initiate another request upon the completion of the memory read operation.

During the memory cycle, timing generator circuit 21-4 operates to generate going timing pulse signal DLY220000. This, in turn, causes NAND gate 21-42 to force signal STDVAL000 to a binary ZERO. This causes the priority circuits 21-1 to reset the grant flip-flops during nonbyte write memory cycles of operation. As soon as the CPU port 1 grant flip-flop resets, the priority circuits 21-1 operate to force CPU port 1 memory busy signal MCOBUSY10 to a binary ZERO. This indicates to the CPU 19-1 that the memory system 20 has completed the read request. At this time, the priority circuits 21-1 are able to start another priority resolution cycle.

The above has illustrated how the organization of the multiport memory system of the present invention is able to concurrently process read and write memory commands asynchronously received from a plurality of CPU and I/O memory ports. Additionally, each memory port includes circuits for independently reporting status information pertaining to each request received by the memory port. This facilitates diagnosis of error conditions within the system. The number of memory ports of the memory system of the present invention may be expanded or reduced as necessary to accommodate different system requirements. Additionally, the memory system can be used with other types of processing units or data handling devices.

It will be appreciated by those skilled in the art that many changes may be made to the illustrated embodiment. For example, it is possible to use other types of priority resolution and timing circuits than those disclosed. Also, other types of asynchronously operated system buses may be utilized as well.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system including a main memory system having a number of memory modules, said memory system having M+N number of memory ports coupled to said number of memory modules wherein M and N are whole integers, each of M number of said ports being directly coupled to a different one of M number of CPUs and each of N number of said ports being coupled to a plurality of I/O controllers which connect in common to one of N number of system buses for receiving asynchronously generated memory read and write requests from said CPUs and I/O controllers respectively, said requests including a control portion coded to specify the type of memory operation, an address portion specifying where in said memory modules data is to be accessed from or written into in addition to a data portion containing any data to be written therein, said memory system further including:
   a priority resolver circuit coupled to each of said M+N number of memory ports, to said M number of CPUs and to each of said N number of system buses for receiving said requests and for generating control signals indicative of the status of resolving competing requests during a priority resolution cycle of operation; and,
   timing generator means coupled to said priority resolver circuit, said generator means in response to one of said control signals generating a sequence of timing signals for performing a memory cycle of operation, and each of said memory ports comprising:
   a plurality of sections, a number of said sections being coupled to receive and store said control, address and data portions respectively of said asynchronously generated memory requests, different ones of said sections of said each memory port in response to said sequence of timing signals selectively applied by said timing generator means in response to other ones of said control signals, being enabled respectively to transfer said control, address and data portions to said memory modules and to store data read out from said memory modules which is to be asynchronously transferred to either said one CPU or to the system bus coupled to said memory port.

2. The system of claim 1 wherein said plurality of sections further includes address, control, input data, and output data sections, said control, address, input data, and output data sections being coupled to store said control, address, and data portions of said memory requests and said memory data respectively, said control section being coupled to said input data and output data sections for conditioning said data sections for said data transfers in response to said timing and control signals.

3. The system of claim 2 wherein predetermined priority levels are assigned to said M number of CPU memory ports and N number of system bus I/O memory ports, said priority resolver circuit generating M+N number of said control signals and generating complementary control signals whose states indicate an intermediate result of resolving competing requests, means for applying predetermined combinations of said control signals and said complementary control signals to said control sections for enabling said memory system to process in parallel, competing memory requests stored in said memory ports.

4. The system of claim 3 wherein said system bus I/O memory requests are assigned higher priority than said CPU memory requests and within said M number of CPUs, CPU 1 is assigned the highest priority and CPU M is assigned the lowest priority and within said N number I/O system buses, system bus 1 is assigned the highest priority and system bus N is assigned the lowest priority.

5. The system of claim 3 wherein said timing generator means includes means for generating row and column address timing signals and M+N number of port timing sections coupled to said means, each of said timing sections being connected to receive one of said predetermined combinations of said control and complementary control signals, said each port timing section including a pair of gating means, for combining said one of said predetermined combination of said control and complementary control signals with said row address and column address timing signals to generate a pair of timing control signals whose states define which memory port has been finally awarded priority, said pair of timing control signals being applied to said control and address sections of said corresponding memory port for conditioning said sections for transferring said control and address portions and for enabling said control section to condition said input data and output data sections respectively for transferring and receiving memory data.

6. The system of claim 1 wherein each one of said N numbers of system buses includes circuits for asynchronously transferring information over said each one of said buses during asynchronously generated bus transfer cycles of operation.

7. The system of claim 2 wherein said priority resolution circuit in response to said memory requests generates busy signals whose states indicate when said memory system is still processing said requests, corresponding ones of said CPUs generating said requests being conditioned by said states of said busy signals to continue other processing while awaiting memory data, and said memory system upon completing the processing of said request switching said state of one of said busy signals enabling a corresponding CPU or I/O system bus to make another request facilitating the processing of memory requests in parallel.

8. The system of claim 2 wherein said priority resolution circuit in response to said requests generates said one of said control signals for conditioning said timing generator means to initiate said memory cycle of operation before said priority resolution circuit finally determines which one of said number of memory ports is to have the processing of its stored memory request completed by said memory system.

9. The system of claim 2 wherein said memory system further includes EDAC circuits coupled to said memory modules and to said input data and output data sections, said EDAC circuits generating check bit signals, corrected data signals and single and multiple error status signals for denoting the presence of single and multiple errors in said data read out from said memory modules and each of said output data sections further including status apparatus coupled to said EDAC circuits, to said control section and to a corresponding one of said number of CPUs or I/O system buses, said control section of each of said memory ports conditioning said status apparatus to store status signals corresponding to the states of said single and multiple error signals for subsequent transfer to said corresponding one of said CPUs or I/O system bus for independent analysis.

10. A data processing system including a memory system having a number of memory modules and a plurality of memory ports, said memory system being accessed in response to asynchronously generated memory requests, each including a control portion coded to specify the memory operation to be performed by said memory system, an address portion specifying where in said memory modules data is to be accessed from or written into in addition to a data portion containing any data to be written therein, said memory system being directly accessible by a first number of processing units through a first number of said plurality of memory ports and said memory system being indirectly accessible by pluralities of data handling units connected in common to a second number of system buses through a second number of said plurality of memory ports, each of said first and second numbers of memory ports including address, control, input data, and, output data sections coupled to receive and store said address, control, and data portions respectively of said asynchronously generated requests received from said processing unit or from system bus connected thereto; and said memory system further including:

a priority resolver circuit coupled to said plurality of memory ports, to said first number of processing units and to said second number of system buses for receiving said requests and for generating control signals indicative of the status of resolving competing requests during a priority resolution cycle of operation; and, timing generator means coupled to said priority resolver circuit, said generator means in response to one of said control signals generating a sequence of timing signals for performing a memory cycle of operation, said timing generator means being conditioned by other ones of said control signals to selectively apply said sequence of said timing signals to said address and said control sections of one of said memory ports granted memory access by said priority resolver circuit for transferring said stored control and address portions to said memory modules for controlling the operation of said memory modules and said control section in response to said timing signals and said control signals conditioning said input data and output data sections respectively to transfer said data portion to said memory modules and to store for asynchronously transferring data read out from said memory modules during said memory cycle of operation.

11. The system of claim 10 wherein predetermined priority levels are assigned to said first number of processing units and said second number of system buses, said priority resolver circuit generating a plurality of said control signals and generating complementary control signals indicating the result of resolving competing requests, means for applying one or more of said control signals and said complementary control signals to said memory port control sections for enabling said memory system to process in parallel, competing memory requests stored in said memory ports.

12. The system of claim 11 wherein said system buses are assigned higher priority than said processing units and within said first number of processing units, a first one of said processing units is assigned the highest priority and a last one of said processing units is assigned the lowest priority and within said second number system buses, a first one of said system buses is assigned the highest priority and a last one of said system buses is assigned the lowest priority.

13. The system of claim 11 wherein said timing generator means includes means for generating row and column address timing signals and a plurality of port timing sections coupled to said means for generating, each of said timing sections being connected to receive one of said one or more of said control signals and complementary control signals, said each port timing section including a pair of gating means, for combining said one or more control signals and complementary control signals with said row address and column address timing signals to generate a pair of timing control signals whose states define when said each memory port has been granted said memory access, said pair of timing control signals conditioning said control and address sections of said each memory port for said transferring said control and address portions and for enabling said control section to condition said input data and output data sections respectively for transferring and receiving memory data.

14. The system of claim 10 wherein said data handling units of each one of said second number of system buses include circuits for asynchronously transferring memory requests over said system bus to said memory port associated therewith and for asynchronously receiving data from said memory port during bus transfer cycles of operation.

15. The system of claim 14 wherein each of said first number of processing units includes circuits for asynchronously transferring memory requests directly to said memory port associated therewith and for asynchronously receiving data from said memory port.

16. The system of claim 10 wherein said priority resolution circuit in response to said memory requests generates busy signals for applying a different one of said busy signals to each of said memory ports, the state of each busy signal indicating when said memory system is still processing said request from said port, said busy signal enabling a corresponding processing unit to continue its processing while awaiting memory data, and said memory system upon completing the processing of said request switching said state of said busy signal enabling a corresponding processing unit or data handling unit of a corresponding system bus to make another request facilitating the processing in parallel of said memory requests stored in said memory ports.

17. The system of claim 10 wherein said priority resolution circuit in response to said requests generates an output signal for conditioning said timing generator means to initiate said memory cycle of operation before said priority resolution circuit finally determines which one of said memory ports has been granted said memory access.

18. The system of claim 10 wherein said memory system further includes error detection and correction (EDAC) circuits coupled to said memory modules and to said input data and output data sections of each memory port, said EDAC circuits generating error status signals for denoting the presence of errors in said data read out from said memory modules and each of said output data sections further including status apparatus coupled to said EDAC circuits, to said control section and to a corresponding one of said processing units or system buses, said control section of said each memory port conditioning said status apparatus during said memory cycle of operation to store indications of said error status signals for enabling subsequent independent error reporting to said processing units and said data handling units.

19. A data processing system including a single computer board containing a main memory system having a number of memory modules and a number of central processing units (CPUs), said memory system further including a plurality of CPU memory ports and I/O memory ports, each CPU being directly coupled to a different one of said CPU memory ports for asynchronously transmitting memory requests and for asynchronously receiving memory data and said data processing system further including a plurality of input/output controllers, groups of said input/output controllers being connected in common to different ones of a number of system buses, each of said system buses being connected to a different one of said I/O memory ports for asynchronously transmitting memory requests from said input/output controllers and for asynchronously receiving memory data, said requests including a control portion coded to specify the memory operation to be performed by said memory system, an address portion specifying where in said memory modules data is to be accessed from or written and a data portion containing any data to be written, said memory system further including:

a priority resolver circuit coupled to said CPU and I/O memory ports, to said number of CPUs and system buses for receiving said requests and for generating control signals including grant control signals in response to said requests indicative of the status of resolving competing requests during a priority resolution cycle of operation; and, timing generator means coupled to said priority resolver circuit and in response to one of said control signals generating a sequence of timing signals for performing a memory cycle of operation, and each of said CPU and I/O memory ports comprising:

a control, an address, an input data, and an output data sections coupled to receive and store said control, address and data portions respectively of said memory requests applied to said memory port, said sections of said each memory port in response to said sequence of timing signals from said timing generator means selectively applied to one of said memory ports specified by said grant control signals as having been granted access, transferring said control and address portions stored in said memory port sections for controlling the operation of said memory modules during said memory cycle of operation and said control section in response to said grant control signals conditioning said input data and output data sections respectively of said memory port granted access, to transfer any data to be written to said memory modules and to store data received from said memory modules for subsequent asynchronous transfer to said one CPU or system bus connected thereto.

20. The system of claim 19 wherein predetermined priority levels are assigned to said plurality of CPU memory ports and said plurality of I/O memory ports, said priority resolver circuit generating a number of said grant control signals and generating complementary grant control signals whose states indicate an intermediate result of resolving competing requests, a different predetermined one or combination of said grant control signals and said complementary grant control signals being applied to said control section of each memory port for enabling the processing of concurrently stored memory requests in parallel.

21. The system of claim 20 wherein said I/O memory ports are assigned higher priority than said CPU memory memory ports and within said plurality of CPU ports, a first one of said CPU memory ports is assigned the highest priority and a last one of said CPU memory ports is assigned the lowest priority and within said plurality I/O memory ports, a first one of said I/O memory ports is assigned the highest priority and a last one of said I/O memory ports is assigned the lowest priority.

22. The system of claim 21 wherein said timing generator means includes means for generating row and column address timing signals and a plurality of port timing sections coupled to said generating means, each of said timing sections being connected to receive one of said predetermined one or combination of said grant control and complementary grant control signals, said each port timing section including a pair of gating means, for combining said predetermined one or combination of said grant control and complementary control signals with said row address and column address timing signals to generate a pair of timing signals whose states define when said memory port has been finally granted said memory access, said pair of timing control signals being applied to said control and address sections of said corresponding memory port for conditioning said sections for said transferring said control and address portions to said memory modules and for enabling said control section to condition said input and output data sections respectively for transferring and receiving said data.

23. The system of claim 19 wherein said I/O controllers of each one of said number of system buses include circuits for asynchronously transferring memory requests over said system bus to said memory port associated therewith and for asynchronously receiving data from said memory port during bus transfer cycles of operation.

24. The system of claim 23 wherein each of said plurality of CPUs includes circuits for asynchronously transferring memory requests directly to said memory port associated therewith and for asynchronously receiving data from said memory port.

25. The system of claim 19 wherein said priority resolution circuit in response to said memory requests generates busy signals for applying a differrent one of said busy signals to each of said memory ports, the state of each busy signal indicating when said memory system is still processing said request from said port, said busy signal enabling a corresponding CPU to continue processing operations while awaiting memory data, and said memory system upon completing the processing of said request switching said state of said busy signal enabling a corresponding CPU or I/O controller of a corresponding system bus to make another request facilitating the processing of said memory requests in parallel stored in said memory ports.

26. The system of claim 19 wherein said priority resolution circuit in response to said requests generates an output signal for conditioning said timing generator means to initiate said memory cycle of operation before said priority resolution circuit finally determines which one of said memory ports has been granted said memory access.

27. The system of claim 20 wherein said control section of each CPU and I/O memory port includes:
 a register for storing said control portion of each of said memory requests asynchronously received by said port; and,
 control circuits coupled to said register, to said priority resolver circuit and to said input data and output data sections, said control circuits being conditioned by said control portion and said different predetermined one or combination of grant control and complementary grant control signals to generate output control signals for enabling the transfer of said data portion from said input data section to said memory modules and storage of memory data in said output data section as specified by said control portion.

28. The system of claim 27 wherein said control circuits include bistable load control means coupled to said timing generator means, to said control register, and to said input data section, said bistable load control means in response to a predetermined one of said timing signals being switched from a first to a second state as a function of said memory operation specified by said control portion to be performed by said memory system, said bistable load control means when in said second state conditioning said input data section to transfer said stored data portion to said memory modules.

29. The system of claim 28 wherein said memory system further includes error detection and correction (EDAC) circuits coupled to said memory modules and to said input data and output data sections of each memory port, said EDAC circuits generating error status signals for signaling the presence of errors in said data read out from said memory modules and each of said output data sections further including status apparatus coupled to said EDAC circuits, to said bistable load control means of said control section and to a corresponding one of said CPUs or system buses, said bistable load control means conditioning said status apparatus during said memory cycle of operation to store indications of said error status signals for enabling subsequent independent error reporting of the status of said memory port to said CPU or system bus connected to said memory port.

* * * * *